United States Patent
Hatfield et al.

(10) Patent No.: US 9,475,005 B2
(45) Date of Patent: Oct. 25, 2016

(54) THREE-WAY CATALYST SYSTEMS INCLUDING FE-ACTIVATED RH AND BA-PD MATERIAL COMPOSITIONS

(71) Applicant: Clean Diesel Technologies, Inc., Oxnard, CA (US)

(72) Inventors: Randal L. Hatfield, Port Hueneme, CA (US); Edward J. Lee, Oxnard, CA (US); Johnny T. Ngo, Oxnard, CA (US); Stephen J. Golden, Santa Barbara, CA (US)

(73) Assignee: Clean Diesel Technologies, Inc., Oxnard, CA (US)

( * ) Notice: Subject to any disclaimer, the term of this patent is extended or adjusted under 35 U.S.C. 154(b) by 0 days.

(21) Appl. No.: 14/732,473

(22) Filed: Jun. 5, 2015

(65) Prior Publication Data
US 2015/0352532 A1 Dec. 10, 2015

Related U.S. Application Data

(60) Provisional application No. 62/163,231, filed on May 18, 2015, provisional application No. 62/008,674, filed on Jun. 6, 2014.

(51) Int. Cl.
*B01J 27/25* (2006.01)
*B01J 23/00* (2006.01)
(Continued)

(52) U.S. Cl.
CPC ......... *B01D 53/9472* (2013.01); *B01D 53/945* (2013.01); *B01D 53/9454* (2013.01);
(Continued)

(58) Field of Classification Search
CPC ...... B01J 21/066; B01J 23/007; B01J 23/02; B01J 23/10; B01J 23/464; B01J 23/58; B01J 23/63; B01J 23/8906; B01J 23/894; B01J 27/25
USPC ........ 502/201, 302–304, 326–328, 332, 336, 502/338, 339, 349, 355, 439
See application file for complete search history.

(56) References Cited

U.S. PATENT DOCUMENTS

| 4,283,308 A | 8/1981 | Ohara et al. |
| 4,426,319 A | 1/1984 | Blanchard et al. |

(Continued)

FOREIGN PATENT DOCUMENTS

| DE | 29 28 249 | 1/1980 |
| EP | 2 308 595 | 4/2011 |

(Continued)

OTHER PUBLICATIONS

Hayes et al., "Introduction to Catalytic Combustion", pp. 310-313, 1997 OPA (Overseas Publishers Association).
(Continued)

*Primary Examiner* — Cam N. Nguyen
(74) *Attorney, Agent, or Firm* — Alston & Bird LLP

(57) ABSTRACT

Three way catalysts (TWCs) for catalyst systems are disclosed. The disclosed TWC systems include Iron (Fe)-activated Rhodium (Rh) and Barium (Ba)-Palladium (Pd) layers capable of interacting with conventional and/or non-conventional catalyst supports and additives. Variations of TWC system samples are produced including Fe-activated Rh layers deposited onto a washcoat (WC) layer having one or more of an oxygen storage material (OSM). Other TWC system samples are produced including an impregnation (IMPG) layer having loading variations of Ba within a Pd, Ce, and Nd applied onto an OSM WC layer, and a further overcoat layer including Fe-activated Rh is applied onto the IMPG layer. The catalytic performance of disclosed TWC catalysts is evaluated by performing a series of light-off tests, wide pulse perturbation tests, and standard isothermal oxygen storage capacity oscillating tests. Disclosed TWC catalysts exhibit high catalytic performance and significant oxygen storage capacity.

18 Claims, 15 Drawing Sheets

(51) Int. Cl.
*B01J 23/02* (2006.01)
*B01J 23/10* (2006.01)
*B01J 23/40* (2006.01)
*B01J 23/42* (2006.01)
*B01J 23/44* (2006.01)
*B01J 23/56* (2006.01)
*B01J 23/58* (2006.01)
*B01J 23/70* (2006.01)
*B01J 23/74* (2006.01)
*B01J 21/04* (2006.01)
*B01D 53/94* (2006.01)
*B01J 23/89* (2006.01)
*B01J 35/04* (2006.01)
*B01J 23/20* (2006.01)
*B01J 23/63* (2006.01)
*B01J 27/232* (2006.01)
*B01J 35/00* (2006.01)

(52) U.S. Cl.
CPC .............. *B01J 21/04* (2013.01); *B01J 23/002* (2013.01); *B01J 23/10* (2013.01); *B01J 23/20* (2013.01); *B01J 23/63* (2013.01); *B01J 23/894* (2013.01); *B01J 23/8906* (2013.01); *B01J 27/232* (2013.01); *B01J 35/0006* (2013.01); *B01J 35/04* (2013.01); *B01D 2255/1023* (2013.01); *B01D 2255/1025* (2013.01); *B01D 2255/207* (2013.01); *B01D 2255/209* (2013.01); *B01D 2255/2042* (2013.01); *B01D 2255/2061* (2013.01); *B01D 2255/2063* (2013.01); *B01D 2255/2065* (2013.01); *B01D 2255/2066* (2013.01); *B01D 2255/2068* (2013.01); *B01D 2255/2092* (2013.01); *B01D 2255/20715* (2013.01); *B01D 2255/20738* (2013.01); *B01D 2255/40* (2013.01); *B01D 2255/902* (2013.01); *B01D 2255/908* (2013.01); *B01J 2523/00* (2013.01)

(56) References Cited

U.S. PATENT DOCUMENTS

| | | |
|---|---|---|
| 4,629,472 A | 12/1986 | Haney, III et al. |
| 4,868,148 A | 9/1989 | Henk et al. |
| 4,891,050 A | 1/1990 | Bowers et al. |
| 4,892,562 A | 1/1990 | Bowers et al. |
| 4,923,842 A | 5/1990 | Summers |
| 5,024,824 A | 6/1991 | Henk et al. |
| 5,034,020 A | 7/1991 | Epperly et al. |
| 5,168,836 A | 12/1992 | Kraus |
| 5,203,166 A | 4/1993 | Miller |
| 5,266,083 A | 11/1993 | Peter-Hoblyn et al. |
| 5,404,841 A | 4/1995 | Valentine |
| 5,501,714 A | 3/1996 | Valentine et al. |
| 5,535,708 A | 7/1996 | Valentine |
| 5,584,894 A | 12/1996 | Peter-Hoblyn et al. |
| 5,693,106 A | 12/1997 | Peter-Hoblyn et al. |
| 5,732,548 A | 3/1998 | Peter-Hoblyn et al. |
| 5,743,922 A | 4/1998 | Peter-Hoblyn et al. |
| 5,749,928 A | 5/1998 | Epperly et al. |
| 5,809,774 A | 9/1998 | Peter-Hoblyn et al. |
| 5,809,775 A | 9/1998 | Tarabulski et al. |
| 5,819,529 A | 10/1998 | Peter-Hoblyn et al. |
| 5,868,421 A | 2/1999 | Eyrainer |
| 5,921,080 A | 7/1999 | Ulmet et al. |
| 5,924,280 A | 7/1999 | Tarabulski |
| 5,939,354 A | 8/1999 | Golden |
| 5,968,464 A | 10/1999 | Peter-Hoblyn et al. |
| 5,976,475 A | 11/1999 | Peter-Hoblyn et al. |
| 5,977,017 A | 11/1999 | Golden |
| 6,003,303 A | 12/1999 | Peter-Hoblyn et al. |
| 6,023,928 A | 2/2000 | Peter-Hoblyn et al. |
| 6,051,040 A | 4/2000 | Peter-Hoblyn et al. |
| 6,063,350 A | 5/2000 | Tarabulski et al. |
| 6,124,130 A | 9/2000 | Olson |
| 6,203,770 B1 | 3/2001 | Peter-Hoblyn et al. |
| 6,279,603 B1 | 8/2001 | Czarnik et al. |
| 6,352,955 B1 | 3/2002 | Golden |
| 6,361,754 B1 | 3/2002 | Peter-Hoblyn et al. |
| 6,372,686 B1 | 4/2002 | Golden |
| 6,531,425 B2 | 3/2003 | Golden |
| 6,948,926 B2 | 9/2005 | Valentine et al. |
| 7,014,825 B2 | 3/2006 | Golden |
| 7,473,288 B2 | 1/2009 | Toyoda et al. |
| 7,527,776 B2 | 5/2009 | Golden et al. |
| 7,641,875 B1 | 1/2010 | Golden |
| 7,749,472 B2 * | 7/2010 | Chen .................. B01D 53/945 423/213.2 |
| 8,105,561 B2 | 1/2012 | Hatanaka et al. |
| 8,323,601 B2 | 12/2012 | Justic et al. |
| 8,545,780 B1 | 10/2013 | Chen et al. |
| 8,569,198 B2 * | 10/2013 | Hoshino ............ B01D 53/9422 502/174 |
| RE45,083 E | 8/2014 | Kuno |
| 8,802,582 B2 | 8/2014 | Malyala et al. |
| 8,845,987 B1 | 9/2014 | Nazarpoor et al. |
| 8,853,121 B1 | 10/2014 | Nazarpoor et al. |
| 8,858,903 B2 * | 10/2014 | Nazarpoor ........... B01D 53/944 423/213.2 |
| 8,906,330 B2 | 12/2014 | Hilgendorff et al. |
| 9,011,784 B2 * | 4/2015 | Golden ................. C01G 25/00 422/177 |
| 9,012,353 B2 | 4/2015 | Golden et al. |
| 9,216,410 B2 | 12/2015 | Hatfield |
| 2001/0001354 A1 | 5/2001 | Peter-Hoblyn et al. |
| 2002/0001554 A1 | 1/2002 | Czarnik et al. |
| 2002/0042341 A1 | 4/2002 | Golden |
| 2003/0109047 A1 | 6/2003 | Valentine |
| 2003/0126789 A1 | 7/2003 | Valentine et al. |
| 2003/0148235 A1 | 8/2003 | Valentine et al. |
| 2003/0185722 A1 | 10/2003 | Toyoda |
| 2003/0198582 A1 | 10/2003 | Golden |
| 2004/0098905 A1 | 5/2004 | Valentine et al. |
| 2004/0172876 A1 | 9/2004 | Sprague et al. |
| 2005/0132674 A1 | 6/2005 | Toyoda et al. |
| 2005/0160663 A1 | 7/2005 | Valentine |
| 2005/0160724 A1 | 7/2005 | Valentine et al. |
| 2005/0164139 A1 | 7/2005 | Valentine et al. |
| 2005/0188605 A1 | 9/2005 | Valentine et al. |
| 2005/0217751 A1 | 10/2005 | Valentine et al. |
| 2006/0081922 A1 | 4/2006 | Golden |
| 2006/0120936 A1 | 6/2006 | Alive et al. |
| 2006/0166816 A1 | 7/2006 | Zhang et al. |
| 2006/0228283 A1 | 10/2006 | Malyala et al. |
| 2006/0254535 A1 | 11/2006 | Valentine et al. |
| 2006/0260185 A1 | 11/2006 | Valentine et al. |
| 2006/0276332 A1 | 12/2006 | Shore et al. |
| 2007/0015656 A1 | 1/2007 | Valentine et al. |
| 2007/0209272 A1 | 9/2007 | Valentine |
| 2007/0283681 A1 | 12/2007 | Makkee et al. |
| 2008/0044330 A1 * | 2/2008 | Chen .................. B01D 53/945 423/213.5 |
| 2008/0210184 A1 | 9/2008 | Valentine et al. |
| 2008/0219906 A1 * | 9/2008 | Chen .................. B01D 53/945 423/213.5 |
| 2008/0226524 A1 | 9/2008 | Alive et al. |
| 2009/0004083 A1 | 1/2009 | Valentine et al. |
| 2009/0257933 A1 * | 10/2009 | Chen .................. B01D 53/945 423/213.2 |
| 2009/0304566 A1 | 12/2009 | Golden et al. |
| 2009/0324468 A1 * | 12/2009 | Golden ................ B01D 53/945 423/210 |
| 2009/0324469 A1 | 12/2009 | Golden et al. |
| 2010/0124523 A1 | 5/2010 | Chen et al. |
| 2010/0135879 A1 | 6/2010 | Roesch et al. |
| 2010/0212293 A1 | 8/2010 | Deeba et al. |
| 2010/0240525 A1 * | 9/2010 | Golden ................ B01D 53/945 502/65 |
| 2010/0316545 A1 | 12/2010 | Alive et al. |
| 2010/0316547 A1 | 12/2010 | Justice et al. |
| 2011/0239626 A1 | 10/2011 | Makkee et al. |

(56) References Cited

U.S. PATENT DOCUMENTS

| | | | |
|---|---|---|---|
| 2012/0088655 A1* | 4/2012 | Yabuzaki | B01D 53/945 502/174 |
| 2012/0128557 A1 | 5/2012 | Nunan et al. | |
| 2012/0131911 A1 | 5/2012 | Nakagawa et al. | |
| 2012/0183447 A1 | 7/2012 | Kwan et al. | |
| 2013/0115144 A1 | 5/2013 | Golden et al. | |
| 2013/0236380 A1 | 9/2013 | Golden et al. | |
| 2014/0271384 A1 | 9/2014 | Nazarpoor et al. | |
| 2014/0271387 A1 | 9/2014 | Nazarpoor | |
| 2014/0271388 A1 | 9/2014 | Nazarpoor et al. | |
| 2014/0271390 A1* | 9/2014 | Nazarpoor | B01D 53/945 422/177 |
| 2014/0271391 A1 | 9/2014 | Nazarpoor | |
| 2014/0271392 A1 | 9/2014 | Nazarpoor | |
| 2014/0271393 A1 | 9/2014 | Nazarpoor | |
| 2014/0271425 A1 | 9/2014 | Nazarpoor | |
| 2014/0274662 A1 | 9/2014 | Nazarpoor | |
| 2014/0274663 A1 | 9/2014 | Nazarpoor | |
| 2014/0274674 A1 | 9/2014 | Nazarpoor et al. | |
| 2014/0274675 A1* | 9/2014 | Nazarpoor | B01J 23/894 502/303 |
| 2014/0274677 A1 | 9/2014 | Nazarpoor | |
| 2014/0274678 A1 | 9/2014 | Nazarpoor | |
| 2014/0298714 A1 | 10/2014 | Sprague | |
| 2014/0301906 A1 | 10/2014 | Hatfield | |
| 2014/0301909 A1 | 10/2014 | Nazarpoor | |
| 2014/0301926 A1 | 10/2014 | Hatfield | |
| 2014/0301931 A1 | 10/2014 | Nazarpoor | |
| 2014/0302983 A1 | 10/2014 | Nazarpoor | |
| 2014/0323294 A1 | 10/2014 | Nagao et al. | |
| 2014/0334978 A1 | 11/2014 | Hatfield | |
| 2014/0334989 A1 | 11/2014 | Nazarpoor et al. | |
| 2014/0334990 A1 | 11/2014 | Nazarpoor | |
| 2014/0335625 A1 | 11/2014 | Hatfield | |
| 2014/0335626 A1 | 11/2014 | Hatfield | |
| 2014/0336038 A1* | 11/2014 | Nazarpoor | B01J 23/8892 502/65 |
| 2014/0336044 A1 | 11/2014 | Nazarpoor et al. | |
| 2014/0336045 A1 | 11/2014 | Nazarpoor et al. | |
| 2014/0356243 A1 | 12/2014 | Nazarpoor | |
| 2014/0357475 A1* | 12/2014 | Nazarpoor | B01J 23/8892 502/73 |
| 2014/0357479 A1* | 12/2014 | Nazarpoor | B01J 23/8892 502/302 |
| 2014/0360164 A1 | 12/2014 | Sprague et al. | |
| 2014/0364303 A1 | 12/2014 | Hatfield | |
| 2014/0369912 A1 | 12/2014 | Zheng et al. | |
| 2015/0004709 A1 | 1/2015 | Nazarpoor | |
| 2015/0005157 A1 | 1/2015 | Nazarpoor et al. | |
| 2015/0005158 A1 | 1/2015 | Nazarpoor | |
| 2015/0005159 A1 | 1/2015 | Nazarpoor et al. | |
| 2015/0017082 A1 | 1/2015 | Nazarpoor | |
| 2015/0018202 A1 | 1/2015 | Nazarpoor et al. | |
| 2015/0018203 A1 | 1/2015 | Nazarpoor et al. | |
| 2015/0018204 A1* | 1/2015 | Nazarpoor | B01J 23/83 205/304 |
| 2015/0018205 A1 | 1/2015 | Nazarpoor et al. | |
| 2015/0031268 A1 | 1/2015 | Waites et al. | |
| 2015/0050742 A1 | 2/2015 | Nazarpoor | |
| 2015/0051067 A1 | 2/2015 | Nazarpoor et al. | |
| 2015/0093300 A1 | 4/2015 | Arnold et al. | |
| 2015/0105242 A1 | 4/2015 | Nazarpoor et al. | |
| 2015/0105243 A1 | 4/2015 | Nazarpoor et al. | |
| 2015/0105245 A1 | 4/2015 | Nazarpoor et al. | |
| 2015/0105246 A1 | 4/2015 | Nazarpoor et al. | |
| 2015/0105247 A1 | 4/2015 | Nazarpoor et al. | |
| 2015/0139883 A1 | 5/2015 | Notestein et al. | |
| 2015/0147239 A1 | 5/2015 | Launois et al. | |
| 2015/0147251 A1 | 5/2015 | Nazarpoor et al. | |
| 2015/0148215 A1 | 5/2015 | Nazarpoor | |
| 2015/0148216 A1 | 5/2015 | Nazarpoor et al. | |
| 2015/0148220 A1 | 5/2015 | Nazarpoor | |
| 2015/0148222 A1 | 5/2015 | Nazarpoor | |
| 2015/0148223 A1 | 5/2015 | Nazarpoor et al. | |
| 2015/0148224 A1 | 5/2015 | Nazarpoor et al. | |
| 2015/0148225 A1 | 5/2015 | Nazarpoor et al. | |
| 2015/0182951 A1 | 7/2015 | Nazarpoor et al. | |
| 2015/0182954 A1 | 7/2015 | Nazarpoor et al. | |
| 2015/0196902 A1* | 7/2015 | Golden | F01N 3/101 423/213.2 |
| 2015/0238940 A1 | 8/2015 | Nazarpoor et al. | |
| 2015/0238941 A1 | 8/2015 | Nazarpoor et al. | |
| 2015/0258496 A1 | 9/2015 | Hatfield et al. | |
| 2015/0290627 A1 | 10/2015 | Nazarpoor et al. | |
| 2015/0290630 A1 | 10/2015 | Nazarpoor et al. | |
| 2015/0316524 A1 | 11/2015 | Hatfield | |
| 2015/0352494 A1 | 12/2015 | Hatfield et al. | |
| 2015/0352529 A1 | 12/2015 | Nazarpoor et al. | |
| 2015/0352531 A1 | 12/2015 | Hatfield et al. | |
| 2015/0352532 A1 | 12/2015 | Hatfield et al. | |
| 2015/0352533 A1 | 12/2015 | Hatfield et al. | |
| 2016/0023188 A1 | 1/2016 | Nazarpoor et al. | |
| 2016/0030885 A1 | 2/2016 | Hatfield | |
| 2016/0047751 A1 | 2/2016 | Pless et al. | |
| 2016/0082422 A1 | 3/2016 | Nazarpoor et al. | |
| 2016/0121304 A1 | 5/2016 | Nazarpoor et al. | |
| 2016/0121308 A1 | 5/2016 | Nazarpoor et al. | |
| 2016/0121309 A1 | 5/2016 | Nazarpoor et al. | |
| 2016/0136617 A1 | 5/2016 | Nazarpoor et al. | |
| 2016/0136618 A1 | 5/2016 | Nazarpoor et al. | |
| 2016/0136619 A1 | 5/2016 | Nazarpoor et al. | |
| 2016/0136620 A1 | 5/2016 | Nazarpoor et al. | |
| 2016/0136621 A1 | 5/2016 | Nazarpoor et al. | |

FOREIGN PATENT DOCUMENTS

| | | |
|---|---|---|
| WO | WO 90/07561 | 7/1990 |
| WO | WO 94/11467 | 5/1994 |
| WO | WO 95/02655 | 1/1995 |
| WO | WO 97/04045 | 2/1997 |
| WO | WO 97/09523 | 3/1997 |
| WO | WO 97/28358 | 8/1997 |
| WO | WO 97/36676 | 10/1997 |
| WO | WO 98/22209 A1 | 5/1998 |
| WO | WO 98/28070 A1 | 7/1998 |
| WO | WO 00/30739 A1 | 6/2000 |
| WO | WO 00/75643 A1 | 12/2000 |
| WO | WO 01/85876 A1 | 11/2001 |
| WO | WO 03/068363 A1 | 8/2003 |
| WO | WO 2004/058641 A1 | 7/2004 |
| WO | WO 2009/139860 A1 | 11/2009 |
| WO | WO 2011/068509 A1 | 6/2011 |
| WO | WO 2014/194101 A1 | 12/2014 |
| WO | WO 2015/199687 A1 | 12/2015 |
| WO | WO 2015/199688 A1 | 12/2015 |
| WO | WO 2016/039747 A1 | 3/2016 |

OTHER PUBLICATIONS

International Search Report and Written Opinion for corresponding International Application No. PCT/IB2016/052877, dated Jul. 26, 2016.

International Search Report and Written Opinion for corresponding International Application No. PCT/US2015/034538, dated Aug. 26, 2015.

* cited by examiner

THREE-WAY CATALYST SYSTEMS INCLUDING FE-ACTIVATED RH AND BA-PD MATERIAL COMPOSITIONS

CROSS-REFERENCE TO RELATED APPLICATIONS

This application claims the benefit of U.S. application Ser. No. 62/008,674, filed Jun. 6, 2014, and U.S. application Ser. No. 62/163,231, filed May 18, 2015, each of which are hereby incorporated by reference as if set forth in their entireties.

BACKGROUND

1. Field of the Disclosure

The present disclosure relates in general to materials used in three-way catalytic (TWC) converters, and more specifically, to TWC catalysts systems including Fe-activated Rh and Ba—Pd material compositions employed within TWC converters.

2. Background Information

Three-way catalyst (TWC) systems are located within the exhaust systems of internal combustion gas engines to promote the oxidation of unburned hydrocarbons (HC) and carbon monoxide (CO), and the reduction of nitrogen oxides ($NO_X$) within the exhaust gas stream.

The elevated cost of conventional TWC systems for controlling/reducing HC, CO and $NO_X$ emissions is primarily due to (a) the presence of complex groups of metal compounds within the catalyst systems and (b) the cost of obtaining said metals.

The catalysts in TWC systems typically contain platinum group metals (PGM), e.g., Platinum (Pt), Palladium (Pd), and Rhodium (Rh), amongst others. Pt and Pd are generally used for HC and CO conversion, while Rh is more effective for the reduction of $NO_X$. Although the price of Rh tends to fluctuate, its greater performance in $NO_X$ conversion makes Rh the most common element employed in TWCs.

Accordingly, as emission standards for HC, CO and $NO_X$ continue to become more stringent, there is a continuing need to provide TWC systems enabled to provide enhanced conversion levels so that the emission limits can be achieved cost-effectively.

SUMMARY

The present disclosure describes three-way catalysts (TWCs) of enhanced catalytic performance. The improvements in catalytic performance are enabled by material compositions including Iron (Fe)-activated Rhodium (Rh) and Barium (Ba)-Palladium (Pd) in layers capable of interacting with conventional and/or non-conventional catalyst supports and additives. Catalysts of enhanced efficiency can be produced using a variety of Barium oxide loadings impregnated onto separate Alumina/OSM layers in interaction with different Rh—Fe loadings and other platinum group metals (PGM) material compositions.

In some embodiments, TWCs are configured to include a substrate and one or more of a washcoat (WC) layer, an impregnation (IMPG) layer, and/or an overcoat (OC) layer. In these embodiments, the WC layer is deposited onto the substrate, the IMPG layer is deposited onto the WC layer, and the OC layer is deposited onto the WC/IMPG layer.

In some embodiments, TWC catalyst samples are produced employing a 1.00 L cordierite substrate having a 4.66" diameter, 600 cells per square inch (CPSI), and 3.5 mil wall thickness. In these embodiments, the WC layer is produced using a slurry that includes one or more of an oxygen storage material (OSM). The OSM can be a fluorite phase oxygen storage material including one or more of Cerium (Ce) oxide within a range from about 10 wt % to about 75 wt %, Zirconium-Hafnium (Zr—Hf) oxide within a range from about 25 wt % to about 90 wt %, Neodymium (Nd) oxide within a range from about 0 wt % to about 15 wt %, and Yttrium (Y) oxide within a range from about 0 wt % to about 15 wt %, and from about 0 wt % to about 15 wt % other light lanthanides.

In a set of exemplary embodiments, herein referred as TWC catalyst Types A, B, C, D, E, F, G, H, I, and J, the WC layer is implemented as a slurry having a total loading of about 60 g/L, including about 31 wt % Ce, about 58.3 wt % Zr—Hf, about 5.5 wt % Nd, and about 5.2 wt % Y oxides, fluorite phase OSM. In these exemplary embodiments, the WC layer is deposited onto the cordierite substrate and further calcined to achieve adhesion of the ceramic-coating layer on top of the substrate.

Further to these exemplary embodiments, one or more IMPG layers are formed using one or more of Rhodium (Rh) nitrate and Iron (Fe) nitrate applied to the coated substrate at selected loadings. Still further to these exemplary embodiments, suitable Rh loadings include loadings within a range from about 1 g/ft$^3$ to about greater than 20 g/ft$^3$, and suitable Fe loadings include loadings within a range from about 60 g/ft$^3$ to about 630 g/ft$^3$. In these exemplary embodiments, the IMPG layer for TWC catalyst Types A, B, C, D, E, F, G, H, I, and J is implemented including loadings of about 3.0 g/ft$^3$ Rh and about 140 g/ft$^3$ Fe in a water-based solution and applied onto the WC layer. Further to these exemplary embodiments, the IMPG layer is then calcined to generate the oxides within the porous WC layer. Still further to this exemplary embodiment, TWC catalyst Type A is a reference Fe-activated Rh catalyst which does not include an OC layer and serves as a baseline to gauge the potential effects of other common and/or non-conventional catalyst supports and additives within an OC layer as the other aforementioned TWC catalyst samples.

In these exemplary embodiments, the OC layer for TWC catalyst Types B, C, D, E, F, G, H, I, and J is implemented as a slurry including variations of one or more of an OSM, support oxides, Barium (Ba) carbonate, different doped Alumina, and Strontium (Sr) carbonate, amongst others, at selected total loadings, respectively. Further to these exemplary embodiments, the slurry is deposited onto the impregnated WC layer and subsequently calcined to achieve adhesion of the deposited layer to the top of the impregnated WC layer. All OC layers for catalyst Types B through J are PGM free catalysts. The main driver on catalytic activity is the Fe-activated Rh OSM layer underneath. This allows the detection of positive and negative influences of the other coating materials.

TWC catalyst Type B includes an OSM comprising about 30 wt % Ce, about 60% Zr—Hf, about 5% Nd, and about 5% Praseodymium (Pr) oxides. TWC catalyst Type C includes an OSM comprising about 31 wt % Ce, about 58.3 wt % Zr—Hf, about 5.5 wt % Nd, and about 5.2 wt % Y oxides. TWC catalyst Type D includes a high surface area Alumina oxide. TWC catalyst Type E includes a high surface area Lanthanum (La)-stabilized Alumina oxide. TWC catalyst Type F includes a specialized highly calcined, high surface area, La-stabilized Alumina oxide. TWC catalyst Type G includes a Ba carbonate powder. TWC catalyst Type H includes a La carbonate powder. TWC catalyst Type I includes a Sr carbonate powder. TWC catalyst Type J includes a Niobium (Nb) oxide powder.

In other embodiments, TWC catalyst samples are produced employing a 0.445 L cordierite substrate having a 4.16" diameter, 600 CPSI, and 4.3 mil wall thickness. In these embodiments, the WC layer is produced using a slurry having material compositions of about 40 wt % of an OSM including about 31 wt % Ce, about 58.3 wt % Zr—Hf, about 5.5 wt % Nd, and about 5.2 wt % Y oxides, and about 60 wt % of a high surface area Alumina with $La_2O_3$ stabilized at high temperature. Further to these embodiments, the slurry is deposited onto the cordierite substrate as a WC layer and further calcined to achieve adhesion of the ceramic-coating layer on top of the substrate.

In another set of exemplary embodiments, herein referred as TWC catalyst Types K, L, M, N, O, P, and Q, the IMPG layer is produced as a slurry including Palladium (Pd) nitrate, Ce nitrate, and Nd nitrate using loadings of about 92.6 $g/ft^3$ Pd, about 105.8 $g/ft^3$ Ce, and about 12.1 $g/ft^3$ Nd. In these exemplary embodiments, the slurry includes loading variations using a soluble Ba salt within a range of Ba loading from about 57.6 $g/ft^3$ to about 691.3 $g/ft^3$. Further to these exemplary embodiments, the water-based solution of Pd, Ce, Nd, and Ba salts is deposited onto the WC layer and further calcined to generate the oxides within the porous WC layer.

In these exemplary embodiments, the OC layer for TWC catalyst Types K, L, M, N, O, P, and Q is implemented as a slurry including a powder batch of a Ce—Zr—Nd—Y OSM that is first impregnated with Fe nitrate and then calcined at about 750° C. Further to these exemplary embodiments, a water based slurry of the powder along with Rh nitrate is employed to form the OC layer using loadings of about 9.07 $g/ft^3$ Rh, about 210 $g/ft^3$ Fe, and a total loading of about 100 g/L. In these exemplary embodiments, the OC layer is further calcined to achieve adhesion of the coating layer to the top of the impregnated WC layer.

In some embodiments, a TWC catalyst sample, herein referred as TWC catalyst Type R, is produced including aforementioned WC layer, and cordierite substrate as within TWC catalyst Type K. In these embodiments, the IMPG layer is implemented as a slurry including water soluble salts of Pd, Ce, Nd, and Ba using loadings of about 22.0 $g/ft^3$ Pd, 115.2 $g/ft^3$ Ba, 105.8 $g/ft^3$ Ce, and 12.1 $g/ft^3$ Nd. Further to these embodiments, the slurry is deposited onto the WC layer and further calcined to generate the oxides within the porous WC layer. Still further to these embodiments, the OC layer for TWC catalyst Type R is implemented as a slurry including a powder batch of a Ce—Zr—Nd—Y OSM which is first impregnated with Fe nitrate and then calcined at about 750° C. In these embodiments, a water-based slurry of the powder along with Rh Nitrate is employed to form an OC layer using loadings of about 3.6 $g/ft^3$ Rh, about 210 $g/ft^3$ Fe, and a total loading of about 100 g/L. Further to these embodiments, the OC layer is further calcined to achieve adhesion of the coating layer to the top of the impregnated WC layer.

In other embodiments, a commercially available SULEV30 close-coupled catalyst (CCC), herein referred as reference catalyst Type 1, is employed to compare catalytic performance for TWC activity with the aforementioned TWC catalyst samples produced. In these embodiments, the reference catalyst Type 1 includes a 1.00 L cordierite substrate having a 4.16" diameter, 400 CPSI, and 3.5 mil wall thickness, and platinum group metal (PGM) loadings of about 94.7 $g/ft^3$ Pd and about 7.3 $g/ft^3$ Rh.

In some embodiments, the catalytic performance of the aforementioned TWC catalyst samples and the reference catalyst Type 1 is evaluated by performing a series of LO tests to determine the temperature at which 50% conversion ($T_{50}$) and the temperature at which 90% conversion ($T_{90}$) of pollutants including Nitrogen oxides ($NO_x$), Carbon monoxide (CO), and Hydrocarbons (HC) are achieved. In these embodiments, the LO tests are performed using a gas stream composition including CO, Hydrogen, Propene, Propane, Nitric oxide, Water, Carbon dioxide, nitrogen for the remaining amount, and a square wave-varying Oxygen ($O_2$) concentration. Further to these embodiments, the LO tests are performed at a space velocity (SV) of about 90,000 $h^{-1}$, average R-value of about 1.05 (rich condition close to stoichiometric condition), air-to-fuel (A/F) span of about 0.4, and gas temperature ramping at about 40° C./min to about 550° C.

In other embodiments, the catalytic performance of the aforementioned TWC systems is evaluated by performing a series of wide pulse perturbation tests (WPPT) to determine combinations of TWC performance and kinetically-limited reductive/oxidative storage capacity of the TWC catalyst samples, as well as to illustrate the catalyst's performance during out-of-loop A/F ratio excursions. In these embodiments, the net conversion per pollutant is calculated after the $NO_x$, HC, and CO emissions are measured every second and averaged over about a 5 minute interval after about a 2 minute settling time. Further to these embodiments, the series of WPPTs are conducted at average R-value of about 1.05 (rich condition close to stoichiometric condition) and A/F ratio span of about 0.8 and period of about 8 seconds.

In some embodiments, a series of standard isothermal oxygen storage capacity (OSC) oscillating tests are conducted to determine the OSC property of the aforementioned TWC catalyst samples in terms of $O_2$ and CO delay times.

The TWC systems including Fe-activated Rh and Ba—Pd catalyst layers outperform conventional TWC catalysts when their LOs and catalytic performance are compared. The TWC systems, including layers of the disclosed material compositions, exhibit early light-offs than conventional TWC systems, thereby improving pollutants (e.g., $NO_x$, CO, HC) emissions conversion efficiency. The disclosed TWC material compositions exhibiting high catalytic performance are produced employing low loadings of Rh, thereby the costs associated with the use of PGM materials within TWC systems are reduced. The disclosed TWC material compositions exhibit enhanced OSC property, thereby facilitating a highly significant transport of materials in and out of the Fe-activated Rh catalyst layers and providing improved interactions with conventional and unconventional catalyst supports and additives.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
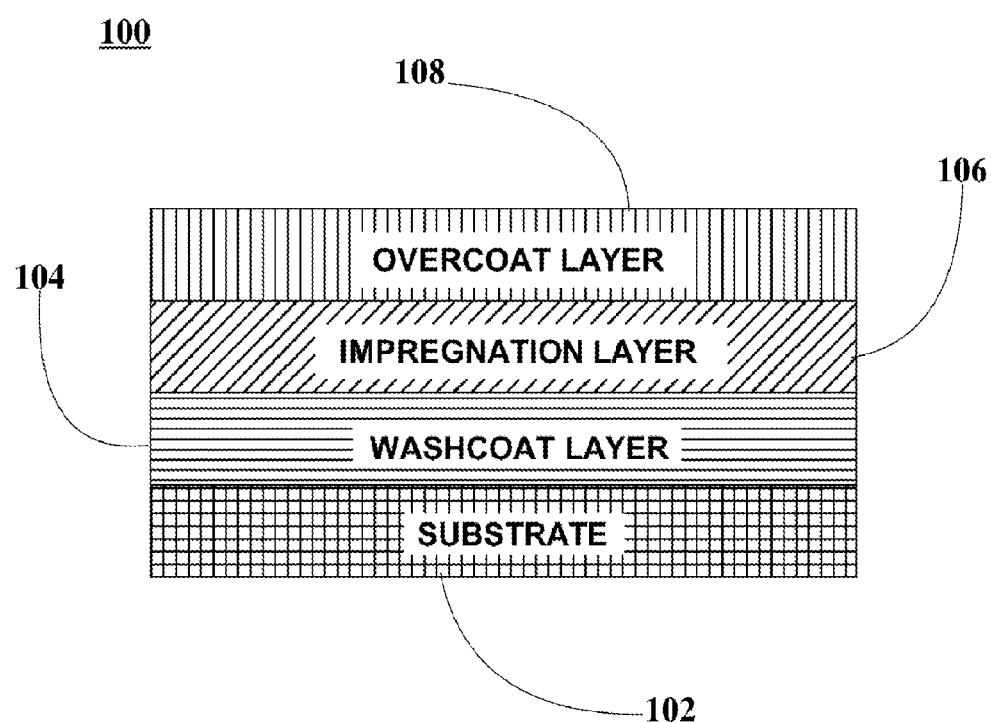
FIG. 1 is a graphical representation illustrating a catalyst structure used for three-way catalyst (TWC) samples including a substrate and one or more of a washcoat layer, an impregnation layer, and/or an overcoat layer, according to an embodiment.

The present disclosure is described herein in detail with reference to embodiments illustrated in the drawings, which form a part hereof. Other embodiments may be used and/or other modifications may be made without departing from the scope or spirit of the present disclosure. The illustrative embodiments described in the detailed description are not meant to be limiting of the subject matter presented.

Definitions

As used here, the following terms have the following definitions:

"Air/Fuel ratio or A/F ratio" refers to the mass ratio of air to fuel present in a combustion process.

"Calcination" refers to a thermal treatment process applied to solid materials, in presence of air, to bring about a thermal decomposition, phase transition, or removal of a volatile fraction at temperatures below the melting point of the solid materials.

"Catalyst" refers to one or more materials that may be of use in the conversion of one or more other materials.

"Catalyst system" refers to any system including a catalyst, such as, a PGM catalyst or a ZPGM catalyst of at least two layers comprising a substrate, a washcoat and/or an overcoat.

"CO delay time" refers to the time required to reach to 50% of the CO concentration in feed signal during an isothermal oscillating test.

"Conversion" refers to the chemical alteration of at least one material into one or more other materials.

"Conversion efficiency" refers to the percentage of emissions passing through the catalyst that are converted to their target compounds.

"Impregnation" refers to the process of imbuing or saturating a solid layer with a liquid compound or the diffusion of some element through a medium or substance.

"Lean condition" refers to exhaust gas condition with an R value less than 1.

"Light off" refers to the time elapsed from an engine cold start to the point of 50 percent pollutant conversion.

"$O_2$ delay time" refers to the time required to reach to 50% of the $O_2$ concentration in feed signal during an isothermal oscillating test.

"Overcoat layer" refers to a catalyst layer of at least one coating that can be deposited onto at least one washcoat layer or impregnation layer.

"Oxygen storage capacity (OSC)" refers to the ability of materials used as OSM in catalysts to store oxygen at lean condition and to release it at rich condition.

"Oxygen storage material (OSM)" refers to a material that absorbs oxygen from oxygen rich gas flows and further able to release oxygen into oxygen deficient gas flows.

"Platinum group metals (PGM)" refers to platinum, palladium, ruthenium, iridium, osmium, and rhodium.

"R-value" refers to the value obtained by dividing the total reducing potential of the gas mixture (in Moles of Oxygen) by the total oxidizing potential of the gas mixture (in moles of Oxygen).

"Rich condition" refers to exhaust gas condition with an R value greater than 1.

"Stoichiometric condition" refers to the condition when the oxygen of the combustion gas or air added equals the amount for completely combusting the fuel, an exhaust gas condition with an R-value equal to 1.

"Substrate" refers to any material of any shape or configuration that yields a sufficient surface area for depositing a washcoat layer and/or an overcoat layer.

"Support oxide" refers to porous solid oxides, typically mixed metal oxides, which are used to provide a high surface area which aids in oxygen distribution and exposure of catalysts to reactants such as NOx, CO, and hydrocarbons.

"$T_{50}$" refers to the temperature at which 50% of a material is converted.

"$T_{90}$" refers to the temperature at which 90% of a material is converted.

"Three-way catalyst (TWC)" refers to a catalyst able to perform the three simultaneous tasks of reduction of nitrogen oxides to nitrogen and oxygen, oxidation of carbon monoxide to carbon dioxide, and oxidation of unburnt hydrocarbons to carbon dioxide and water.

"Washcoat layer" refers to a catalyst layer of at least one coating, including at least one oxide solid that can be deposited onto a substrate.

"Wide pulse perturbation test" refers to a catalytic performance test during which A/F ratio perturbations of longer duration and increased amplitude are used to assess catalytic performance, as compared with the light-off test.

Description of the Disclosure

Disclosed herein are materials used as support oxides within three-way catalyst (TWC) catalytic converters, said support oxides including Niobium Oxide, Zirconia, and Alumina.

Material Compositions and Production of TWC Samples According to Catalyst Structure FIG. 1 is a graphical representation illustrating a catalyst structure used for three-way catalyst (TWC) samples including a substrate, one or more of a washcoat (WC) layers, an impregnation (IMPG) layer, and/or an overcoat (OC) layer, according to an embodiment. In FIG. 1, TWC structure 100 includes substrate 102, WC layer 104, IMPG layer 106, and OC layer 108. In some embodiments, WC layer 104 is deposited onto substrate 102, IMPG layer 106 is deposited onto WC layer 104, and OC layer 108 is deposited onto IMPG layer 106. In other embodiments, TWC structure 100 can include additional, fewer, or differently arranged components and layers than those illustrated in FIG. 1. In some embodiments, TWC structure 100 is employed to produce a set of exemplary embodiments of TWC catalyst samples.

TWC Catalyst Type A

In this exemplary embodiment, TWC catalyst Type A includes a 1.00 L cordierite substrate with a 4.66" diameter, 600 cells per square inch (CPSI), and 3.5 mil wall thickness. Further to this embodiment, the cordierite substrate is employed as the monolith upon which a slurry is deposited as a WC layer. In this embodiment, the slurry has a total loading of about 60 g/L, including about 31 wt % Cerium (Ce), about 58.3 wt % Zirconium-Hafnium (Zr—Hf), about 5.5 wt % Neodymium (Nd), and about 5.2 wt % Yttrium (Y) oxides, and a fluorite phase oxygen storage material (OSM). Still further to this embodiment, the WC layer is calcined to achieve adhesion to the top of the cordierite substrate. In this embodiment, an IMPG layer including loadings of about 3.0 g/ft³ Rhodium (Rh) and about 140 g/ft³ Iron (Fe) in a water-based solution is applied onto the WC layer. Further to this embodiment, the IMPG layer is calcined to achieve adhesion to the top of the WC layer. Still further to this exemplary embodiment, TWC catalyst Type A is a reference Fe-activated Rh catalyst which does not include an OC layer.

TWC Catalyst Type B

In this exemplary embodiment, TWC catalyst Type B includes the aforementioned WC and IMPG layers as well as the cordierite substrate as described in TWC catalyst Type A, above. Further to this embodiment, TWC catalyst Type B additionally includes an OC layer having about 37 g/L total loading of an OSM containing about 30 wt % Ce, about 60% Zr—Hf, about 5 wt % Nd, and about 5 wt % Praseodymium (Pr) oxides. In this embodiment, the OC layer is applied onto the impregnated-WC layer and subsequently calcined to achieve adhesion of the OC layer to the top of the impregnated-WC layer.

TWC Catalyst Type C

In this exemplary embodiment, TWC catalyst Type C includes the aforementioned WC and IMPG layers, as well as the cordierite substrate as describe in TWC catalyst Type A, above. Further to this embodiment, TWC catalyst Type C additionally includes an OC layer having about 42 g/L total loading of an OSM containing about 31 wt % Ce, about 58.3 wt % Zr—Hf, about 5.5 wt % Nd, and about 5.2 wt % Y oxides. In this embodiment, the OC layer is applied onto the impregnated-WC layer and subsequently calcined to achieve adhesion of the OC layer to the top of the impregnated-WC layer.

TWC Catalyst Type D

In this exemplary embodiment, TWC catalyst Type D includes the aforementioned WC and IMPG layers, as well as the cordierite substrate as described in TWC catalyst Type A, above. Further to this embodiment, TWC catalyst Type D additionally includes an OC layer having about 32 g/L total loading of a high surface area Alumina oxide. In this embodiment, the OC layer is applied onto the impregnated-WC layer and subsequently calcined to achieve adhesion of the OC layer to the top of the impregnated-WC layer.

TWC Catalyst Type E

In this exemplary embodiment, TWC catalyst Type E includes the aforementioned WC and IMPG layers, as well as the cordierite substrate as described in TWC catalyst Type A, above. Further to this embodiment, TWC catalyst Type E additionally includes an OC layer having about 40 g/L of a high surface area Lanthanum (La)-stabilized Alumina oxide. In this embodiment, the OC layer is applied onto the impregnated-WC layer and subsequently calcined to achieve adhesion of the OC layer to the top of the impregnated-WC layer.

TWC Catalyst Type F

In this exemplary embodiment, TWC catalyst Type F includes the aforementioned WC and IMPG layers, as well as the cordierite substrate as described in TWC catalyst Type A, above. Further to this embodiment, TWC catalyst Type F includes an OC layer having about 37 g/L total loading of a specialized highly calcined, high surface area, high $La_2O_3$ content, La-stabilized Alumina oxide. In this embodiment, the OC layer is applied onto the impregnated-WC layer and subsequently calcined to achieve adhesion of the OC layer to the top of the impregnated-WC layer.

TWC Catalyst Type G

In this exemplary embodiment, TWC catalyst Type G includes the aforementioned WC and IMPG layers, as well as the cordierite substrate as described in TWC catalyst Type A, above. Further to this embodiment, TWC catalyst Type G includes an OC layer having about 23 g/L total loading of a Barium (Ba) carbonate powder. In This embodiment, the OC layer is applied as a slurry onto the impregnated-WC layer and subsequently calcined to achieve adhesion of the OC layer to the top of the impregnated-WC layer.

TWC Catalyst Type H

In this exemplary embodiment, TWC catalyst Type H includes the aforementioned WC and IMPG layers, as well as the cordierite substrate as described in TWC catalyst Type A, above. Further to this embodiment, TWC catalyst Type H includes an OC layer having about 48 g/L total loading of a La carbonate powder. In this embodiment, the OC layer is applied as a slurry onto the impregnated-WC layer and subsequently calcined to achieve adhesion of the OC layer to the top of the impregnated-WC layer.

TWC Catalyst Type I

In this exemplary embodiment, TWC catalyst Type I includes the aforementioned WC and IMPG layers, as well as the cordierite substrate as described in TWC catalyst Type A, above. Further to this embodiment, TWC catalyst Type I includes an OC layer having about 90 g/L total loading of a Strontium (Sr) carbonate powder. In this embodiment, the OC layer is applied as a slurry onto the impregnated-WC layer and subsequently calcined to achieve adhesion of the OC layer to the top of the impregnated-WC layer.

TWC Catalyst Type J

In this exemplary embodiment, TWC catalyst Type J includes the aforementioned WC and IMPG layers, as well as the cordierite substrate as described in TWC catalyst Type A, above. Further to this embodiment, TWC catalyst Type J includes an OC layer having about 98 g/L total loading of a Niobium (Nb) (V) oxide powder. In this embodiment, the OC layer is applied as a slurry onto the impregnated-WC layer and subsequently calcined to achieve adhesion of the OC layer to the top of the impregnated-WC layer.

TWC Catalyst Type K

In this exemplary embodiment, TWC catalyst Type K includes a 0.445 L cordierite substrate with a 4.16" diameter, 600 CPSI, and 4.3 mil wall thickness. Further to this embodiment, the cordierite substrate is employed as the monolith upon which a slurry is deposited as a WC layer. In this embodiment, the slurry has a total loading of about 180 g/L, including about 40% by weight of OSM including about 31 wt % Ce, about 58.3 wt % Zr—Hf, about 5.5 wt % Nd, and about 5.2 wt % Y oxides, and about 60% by weight of a high surface area Alumina with $La_2O_3$ stabilized at high temperature. Still further to this embodiment, the WC layer is calcined to achieve adhesion to the top of the cordierite substrate. In this embodiment, an IMPG layer including Palladium (Pd) nitrate, Ce nitrate, Nd nitrate, and Ba salt with loadings of about 92.6 g/ft$^3$ Pd, about 57.6 g/ft$^3$ Ba, about 105.8 g/ft$^3$ Ce, and about 12.1 g/ft$^3$ Nd in a water-based solution is applied onto the WC layer. Further to this embodiment, the IMPG layer is calcined to achieve adhesion to the top of the WC layer. Still further to this embodiment, a powder batch of the Ce—Zr—Nd—Y OSM is first impregnated with Fe nitrate to form a slurry which is then calcined at about 750° C. to produce Fe-OSM powder. In this embodiment, a water based slurry of the Fe-OSM powder and Rh nitrate is used to form an OC layer and is produced with total loading of about 100 g/L, and Rh loading of about 9.07 g/ft$^3$ and Fe loading of about 210 g/ft$^3$. Further to this embodiment, the OC layer is applied onto the impregnated-WC layer and subsequently calcined to achieve adhesion of the OC layer to the top of the impregnated-WC layer.

TWC Catalyst Type L

In this exemplary embodiment, TWC catalyst Type L includes the aforementioned OC and WC layers as well as the cordierite substrate as described in TWC catalyst Type K, above. Further to this embodiment, the IMPG layer in TWC catalyst Type L additionally includes the aforementioned Pd nitrate, Ce nitrate, and Nd nitrate loadings as in TWC catalyst Type K as well as a different Ba loading of about 115.2 g/ft$^3$.

TWC Catalyst Type M

In this exemplary embodiment, TWC catalyst Type M includes the aforementioned OC and WC layers, as well as the cordierite substrate as described in TWC catalyst Type K, above. Further to this embodiment, the IMPG layer in TWC catalyst Type M additionally includes the aforementioned Pd nitrate, Ce nitrate, and Nd nitrate loadings as in TWC catalyst Type K, as well as a different Ba loading of about 230.4 g/ft$^3$.

TWC Catalyst Type N

In this exemplary embodiment, TWC catalyst Type N includes the aforementioned OC and WC layers, as well as the cordierite substrate as described in TWC catalyst Type K, above. Further to this embodiment, the IMPG layer in TWC catalyst Type N additionally includes the aforementioned Pd nitrate, Ce nitrate, and Nd nitrate loadings as in TWC catalyst Type K, as well as a different Ba loading of about 345.7 g/ft$^3$.

TWC Catalyst Type O

In this exemplary embodiment, TWC catalyst Type O includes the aforementioned OC and WC layers, as well as the cordierite substrate as described in TWC catalyst Type K, above. Further to this embodiment, the IMPG layer in TWC catalyst Type O additionally includes the aforementioned Pd nitrate, Ce nitrate, and Nd nitrate loadings as in TWC catalyst Type K, as well as a different Ba loading of about 460.9 g/ft$^3$.

TWC Catalyst Type P

In this exemplary embodiment, TWC catalyst Type P includes the aforementioned OC and WC layers, as well as the cordierite substrate as described in TWC catalyst Type K, above. Further to this embodiment, the IMPG layer in TWC catalyst Type P includes the aforementioned Pd nitrate, Ce nitrate, and Nd nitrate loadings as in TWC catalyst Type K, as well as a different Ba loading of about 567.1 g/ft$^3$.

TWC Catalyst Type Q

In this exemplary embodiment, TWC catalyst Type Q includes the aforementioned OC and WC layers, as well as the cordierite substrate as described in TWC catalyst Type K, above. Further to this embodiment, the IMPG layer in TWC catalyst Type Q additionally includes the aforementioned Pd nitrate, Ce nitrate, and Nd nitrate loadings as in TWC catalyst Type K, as well as a different Ba loading of about 691.3 g/ft$^3$.

TWC Catalyst Type R

In this exemplary embodiment, TWC catalyst Type R includes the aforementioned WC layer as well as the cordierite substrate as described in TWC catalyst Type K, above. Further to this embodiment, the IMPG layer in TWC catalyst Type R additionally includes Pd nitrate, Ce nitrate, Nd nitrate, and Ba salt with loadings of about 22.0 g/ft$^3$ Pd, about 115.2 g/ft$^3$ Ba, about 105.8 g/ft$^3$ Ce, and about 12.1 g/ft$^3$ Nd, in a water-based solution. Still further to this embodiment, the IMPG layer is applied onto the WC layer and then calcined to achieve adhesion to the top of the WC layer. In this embodiment, a powder batch of the Ce—Zr—Nd—Y OSM is first impregnated with Fe nitrate to form a slurry which is then calcined at about 750° C. to produce Fe-OSM powder. Further to this embodiment, a water based slurry of the Fe-OSM powder and Rh nitrate is used to form an OC layer and is produced with total loading of about 100 g/L, and an Rh loading of about 3.6 g/ft$^3$ and Fe loading of about 210 g/ft$^3$. Further to this embodiment, the OC layer is applied onto the impregnated-WC layer and subsequently calcined to achieve adhesion of the OC layer to the top of the impregnated-WC layer.

In other embodiments, a commercially available SULEV30 close-coupled catalyst (CCC), herein referred as reference catalyst Type 1, is employed to compare catalytic performance for TWC activity with the aforementioned TWC catalyst samples produced. In these embodiments, the reference catalyst Type 1 includes a 1.00 L cordierite substrate having a 4.16" diameter, 400 CPSI, and 3.5 mil wall thickness, and platinum group metal (PGM) loadings of about 94.7 g/ft3 Pd and about 7.3 g/ft3 Rh.

Test Methodologies for Catalytic Performance Assessment of TWC Catalyst Samples

In some embodiments, different test methodologies are employed to assess catalytic performance of the aforementioned TWC catalysts samples. In these embodiments, the test methodologies employed are a series of light-off (LO) tests, wide pulse perturbation tests (WPPTs), and standard isothermal oxygen storage capacity (OSC) oscillating tests.

In some embodiments, for the assessment of the catalytic performance of the aforementioned TWC catalyst samples, core samples measuring about 1 inch in diameter and about 2 inches in length are taken from the coated monoliths, using a diamond core drill. In these embodiments, the core samples are aged at about 1,000° C. for about 20 hours in an atmosphere of about 10% (by mole) of water vapor, about 10% Carbon dioxide ($CO_2$), and Nitrogen ($N_2$) for the remaining amount. Further to these embodiments, the amounts of CO and Oxygen ($O_2$) are varied to simulate the thermal aging associated with driving a vehicle from about 50,000 miles to about 120,000 miles. Further to these embodiments, the aging of the core samples consists of both fuel cut like events with high $O_2$ content, and rich events having an A/F ratio below 13 A/F ratio. Still further to these embodiments, the cores are cooled in the mixed gas at a temperature from about 200° C. to about 300° C. and then removed from the aging system.

In these embodiments, before standard experiments are performed on the core samples, the cores samples are conditioned within a proprietary custom built bench flow reactor employed to test performance of TWCs, diesel oxidation catalysts, catalyzed particulate filters, and selective catalytic reduction (SCR) catalysts. An example of such a proprietary custom built bench flow reactor is disclosed in US Patent Application Publications 2014/0334978, 2014/0335625, and 2014/0335626. Further to these embodiments, conditioning of the core samples is conducted on the bench reactor for about 10 minutes at about 600° C. Still further to these embodiments, for conditioning of the core samples, a gas stream, at a slightly rich R-value of about 1.05 is employed with nearly symmetric lean and rich perturbations at a frequency of about 1 Hz.

Light-off Test Methodology

In some embodiments, the catalytic performance of the TWC catalyst core samples and the reference catalyst Type 1 is evaluated by performing a series of LO tests to determine the temperature at which 50% conversion ($T_{50}$) and the temperature at which 90% conversion ($T_{90}$) of pollutants including Nitrogen oxides ($NO_X$), Carbon monoxide (CO), and Hydrocarbons (HC) are achieved. In these embodiments, the LO tests are performed using a gas stream composition including about 8,000 ppm CO, about 2,000 ppm Hydrogen, about 400 ppm (C3) Propene, about 100 ppm (C3) Propane, about 1,000 ppm Nitric oxide, about 100,000 ppm water, about 100,000 ppm $CO_2$, $N_2$ for the remaining amount, and $O_2$ concentration varying as a square wave signal within a range from about 4,234 ppm to about 8,671 ppm. Further to these embodiments, the average R-value for the gas is about 1.05 and the square wave change in $O_2$ concentration results in an air-to-fuel (A/F) span of about 0.4 units. Further to these embodiments, the LO tests are performed at a space velocity of about 90,000 h$^{-1}$ at the standard conditions of about 21.1° C., at about 1 atmosphere with the total volume enclosed by the monolith surface used as the volume for the space velocity (SV) calculation. Still further to these embodiments, the temperature is stabilized at about 100° C. for about 2 minutes and subsequently, the gas temperature ramps at about 40° C./min to about 550° C., while a gas blanket warms the core holder ramping at the same set point temperature. During these series of tests, the conversion of the gas species are calculated at the temperature points of 50% conversion ($T_{50}$) and 90% conversion ($T_{90}$) for each pollutant.

Wide Pulse Perturbation Test (WPPT) Methodology

In other embodiments, a series of WPPTs are performed at selected temperatures to assess catalytic performance of the TWC catalyst core samples. In these embodiments, the WPPT methodology tests combinations of the TWC performance along with kinetically-limited reductive/oxidative storage capacity of the aforementioned TWC catalyst samples, as well as to illustrate catalytic performance during out-of-loop A/F ratio excursions. Further to these embodiments, the A/F ratio span of the square wave used in these tests is about 0.8 units and the period is about 8 seconds, with an average R-value of about 1.05 (rich condition close to stoichiometric condition). Still further to these embodiments, the $NO_X$, HC, and CO emissions are measured every second and averaged over about a 5 minute interval after about 2 minutes settling time. The net conversion is calculated for each pollutant with a high conversion associated with lower emissions from the catalytic converter if applied to a vehicle or stationary engine.

OSC Isothermal Oscillating Test

In some embodiments, OSC isothermal oscillating tests facilitate the determination of the $O_2$ and CO delay times for a selected number of cycles during which feed signals of $O_2$ and CO pulses are used to determine the OSC performance and verify the OSC aging stability of the aforementioned TWC catalyst samples. In these embodiments, the OSC isothermal oscillating tests are performed on the catalyst samples at a temperature of about 525° C. with a feed of either $O_2$ with a concentration of about 4,000 ppm diluted in inert $N_2$, or CO with a concentration of about 8,000 ppm of CO diluted in inert $N_2$. Further to these embodiments, the OSC isothermal oscillating tests are performed within the proprietary reactor using a SV of about 60,000 h$^{-1}$, ramping from room temperature to a temperature of about 525° C. under a dry $N_2$ environment. When the temperature of about 525° C. is reached, the OSC isothermal oscillating test is initiated by flowing $O_2$ through the catalyst sample within the reactor. After about 240 seconds, the feed flow is switched to CO, thereby allowing CO to flow through the catalyst sample within the reactor for about another 240 seconds. The isothermal oscillating condition between CO and $O_2$ flows is enabled for about 4 cycles of about 480 seconds each, respectively. The last 3 cycles are averaged and reported.

In these embodiments, $O_2$ and CO are allowed to flow first within an empty test reactor, before the OSC isothermal oscillating test of the catalyst samples, in order to establish test reactor benchmarks. Further to these embodiments, a catalyst sample under testing is placed within the test reactor and $O_2$ and CO are allowed to flow. In these embodiments, as the catalyst sample exhibits OSC, the catalyst sample stores $O_2$ when $O_2$ flows. Further to these embodiments, when CO flows there is no $O_2$ flowing and the $O_2$ stored within the catalyst sample reacts with the CO to form $CO_2$. Still further to these embodiments, the time during which the catalyst sample stores $O_2$ and the time during which CO is oxidized to form $CO_2$ are measured to confirm/verify the OSC performance and aging stability of the catalyst samples.

Catalytic Performance of TWC Catalyst Samples

In some embodiments, the catalytic performance of the aforementioned TWC catalyst Types A, B, C, D, E, F, G, H, I, and J is assessed using TWC catalyst core samples. In these embodiments, TWC catalyst core samples are evaluated by performing a series of LO tests to determine the temperature at which 50% conversion ($T_{50}$) and the temperature at which 90% conversion ($T_{90}$) of pollutants including Nitrogen oxides ($NO_X$), Carbon monoxide (CO), and Hydrocarbons (HC) are achieved. Further to these embodiments, $T_{50}$ and $T_{90}$ values achieved per species converted are detailed in Table 1, below.

TABLE 1

$T_{50}$ and $T_{90}$ values for $NO_X$, CO, and HC conversions calculated from LO tests of TWC catalyst samples Types A, B, C, D, E, F, G, H, I, and J, as illustrated in FIGS. 2-5.

| TWC Catalyst | $T_{50}$ (° C.) | | | $T_{90}$ (° C.) | | |
|---|---|---|---|---|---|---|
| Samples Types | $NO_X$ | CO | HC | $NO_X$ | CO | HC |
| A | 259.2 | 254.4 | 282.2 | 308.8 | 264.4 | 348.4 |
| B | 260.5 | 254.1 | 283.9 | 312.4 | 264.5 | 348.1 |
| C | 261.7 | 256.8 | 286.8 | 319.8 | 266.0 | 355.4 |
| D | 263.5 | 257.3 | 290.6 | 321.0 | 269.4 | 356.7 |
| E | 271.7 | 266.8 | 301.2 | 367.5 | 280.3 | 444.5 |
| F | 266.8 | 260.3 | 293.6 | 328.4 | 271.2 | 378.9 |
| G | 265.2 | 260.8 | 291.0 | 367.7 | 271.9 | 460.4 |
| H | 279.1 | 274.2 | 316.7 | 365.7 | 339.9 | >500.0 |
| I | 275.0 | 269.7 | 313.4 | 373.5 | 337.0 | >500.0 |
| J | 271.6 | 268.8 | 311.5 | 353.8 | 339.8 | >500.0 |

Figure 2:
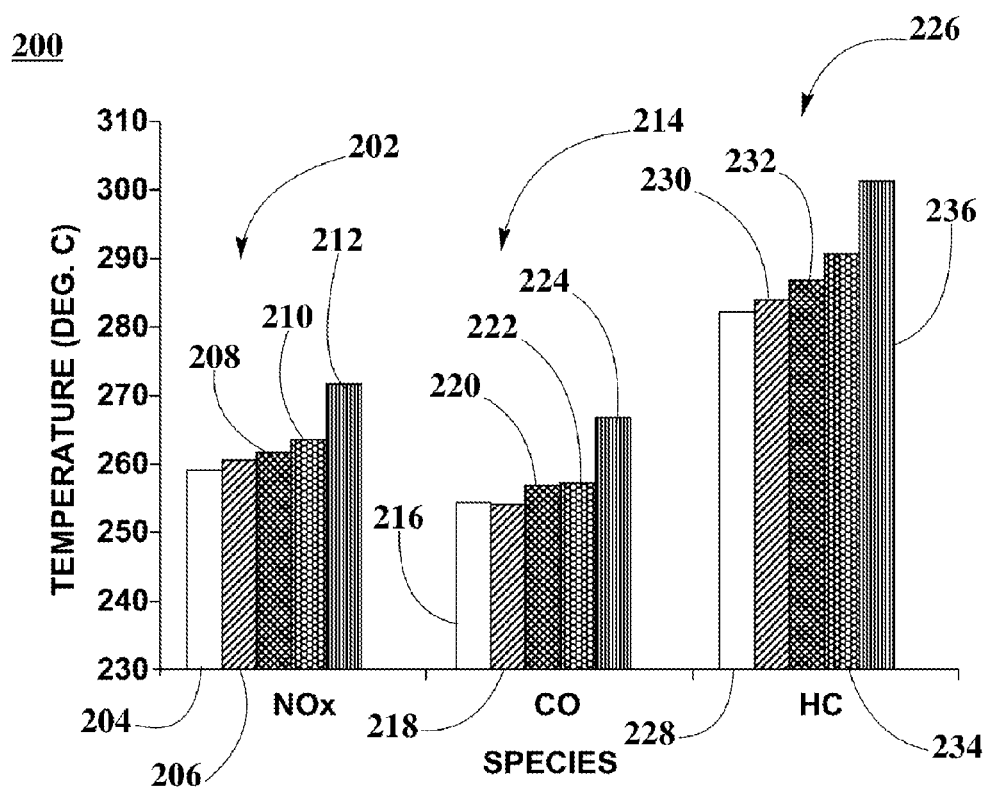
FIG. 2 is a graphical representation illustrating comparisons of $T_{50}$ values of $NO_X$, CO, and HC conversions calculated from a light-off (LO) test methodology for TWC catalyst samples Types A, B, C, D, and E, according to an embodiment.

FIG. 2 is a graphical representation illustrating comparisons of $T_{50}$ values of $NO_X$, CO, and HC conversions calculated from a LO test methodology for TWC catalyst samples Types A, B, C, D, and E, according to an embodiment. In FIG. 2, T50 comparisons 200 include $NO_X$-T50 comparisons 202, CO-T50 comparisons 214, and HC-T50 comparisons 226. In FIG. 2, $NO_X$-T50 comparisons 202 additionally include T50 bar 204, T50 bar 206, T50 bar 208, T50 bar 210, and T50 bar 212. In FIG. 2, CO-T50 comparisons 214 also include T50 bar 216, T50 bar 218, T50 bar 220, T50 bar 222, and T50 bar 224. In FIG. 2, HC-T50 comparisons 226 further include T50 bar 228, T50 bar 230, T50 bar 232, T50 bar 234, and T50 bar 236.

In some embodiments, T50 bar 204, T50 bar 206, T50 bar 208, T50 bar 210, and T50 bar 212 illustrate $T_{50}$ values for $NO_X$ conversion of TWC catalyst samples Types A, B, C, D, and E, respectively. In these embodiments, T50 bar 216, T50 bar 218, T50 bar 220, T50 bar 222, and T50 bar 224 illustrate $T_{50}$ values for CO conversion of TWC catalyst samples Types A, B, C, D, and E, respectively. Further to these embodiments, T50 bar 228, T50 bar 230, T50 bar 232, T50 bar 234, and T50 bar 236 illustrate $T_{50}$ values for HC conversion of TWC catalyst samples Types A, B, C, D, and E, respectively, as detailed in Table 1 above.

Figure 3:
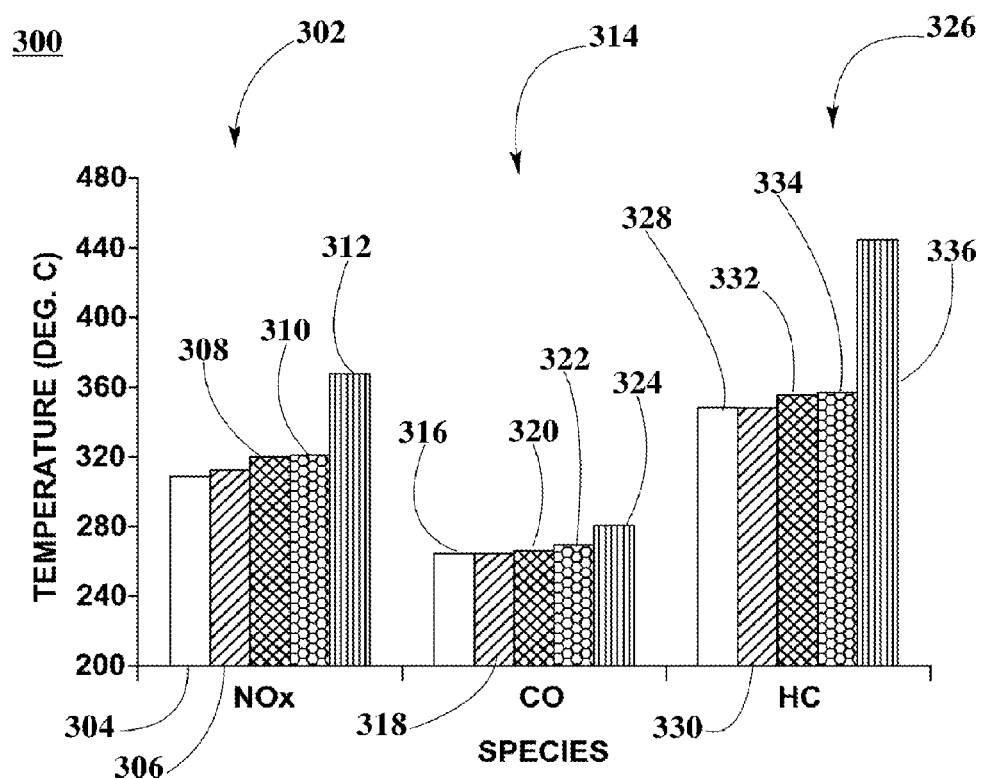
FIG. 3 is a graphical representation illustrating comparisons of $T_{90}$ values of $NO_X$, CO, and HC conversions calculated from a LO test methodology for TWC catalyst samples Types A, B, C, D, and E, according to an embodiment.

FIG. 3 is a graphical representation illustrating comparisons of $T_{90}$ values of $NO_X$, CO, and HC conversions calculated from a LO test methodology for TWC catalyst samples Types A, B, C, D, and E, according to an embodiment. In FIG. 3, T90 comparisons 300 include NOX-T90 comparisons 302, CO-T90 comparisons 314, and HC-T90 comparisons 326. In FIG. 3, NOX-T90 comparisons 302 additionally include T90 bar 304, T90 bar 306, T90 bar 308, T90 bar 310, and T90 bar 312. In FIG. 3, CO-T90 comparisons 314 also include T90 bar 316, T90 bar 318, T90 bar 320, T90 bar 322, and T90 bar 324. In FIG. 3, HC-T90 comparisons 326 further include T90 bar 328, T90 bar 330, T90 bar 332, T90 bar 334, and T90 bar 336.

In some embodiments, T90 bar 304, T90 bar 306, T90 bar 308, T90 bar 310, and T90 bar 312 illustrate $T_{90}$ values for NO conversion of TWC catalyst samples Types A, B, C, D, and E, respectively. In these embodiments, T90 bar 316, T90 bar 318, T90 bar 320, T90 bar 322, and T90 bar 324 illustrate $T_{90}$ values for CO conversion of TWC catalyst samples Types A, B, C, D, E, and E, respectively. Further to these embodiments, T90 bar 328, T90 bar 330, T90 bar 332, T90 bar 334, and T90 bar 336 illustrate $T_{90}$ values for HC conversion TWC catalyst samples Types A, B, C, D, and E, respectively, as detailed in Table 1 above.

Figure 4:
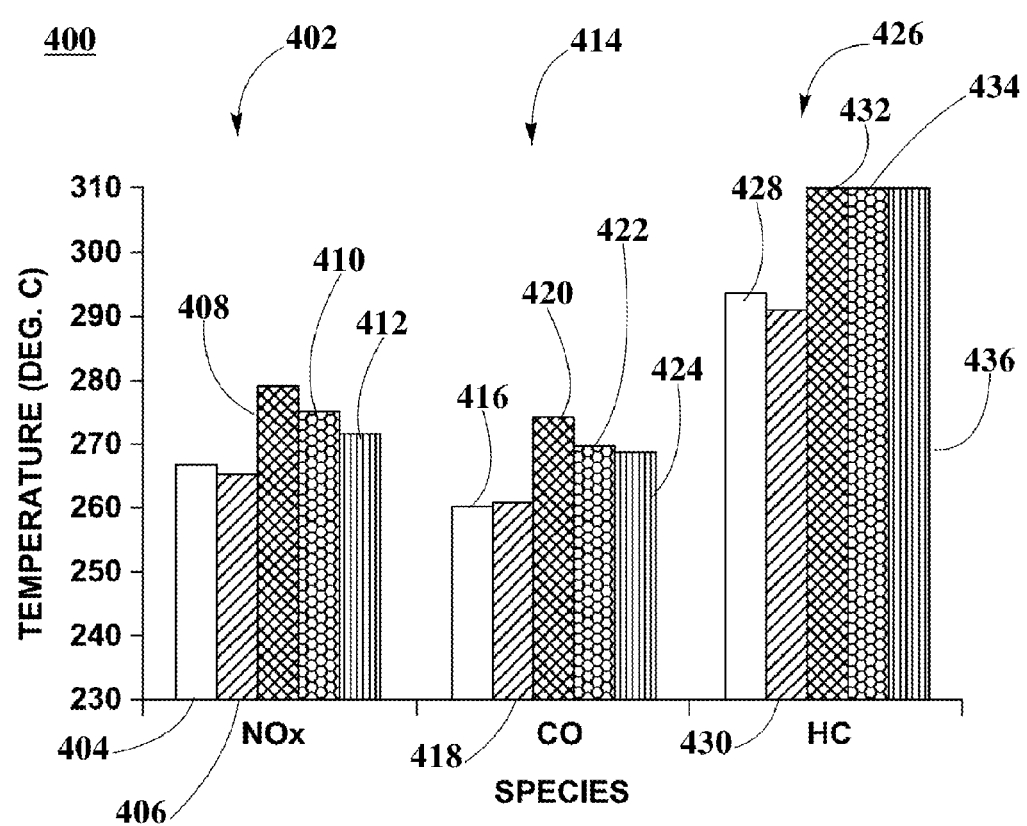
FIG. 4 is a graphical representation illustrating comparisons of $T_{50}$ values of $NO_X$, CO, and HC conversions calculated from a LO test methodology for TWC catalyst samples Types F, G, H, I, and J, according to an embodiment.

FIG. 4 is a graphical representation illustrating comparisons of $T_{50}$ values of $NO_X$, CO, and HC conversions calculated from a LO test methodology for TWC catalyst samples Types F, G, H, I, and J, according to an embodiment. In FIG. 4, T50 comparisons 400 include NOX-T50 comparisons 402, CO-T50 comparisons 414, and HC-T50 comparisons 426. In FIG. 4, NOX-T50 comparisons 402 additionally include T50 bar 404, T50 bar 406, T50 bar 408, T50 bar 410, and T50 bar 412. In FIG. 4, CO-T50 comparisons 414 also include T50 bar 416, T50 bar 418, T50 bar 420, T50 bar 422, and T50 bar 424. In FIG. 4, HC-T50 comparisons 426 further include T50 bar 428, T50 bar 430, T50 bar 432, T50 bar 434, and T50 bar 436.

In some embodiments, T50 bar 404, T50 bar 406, T50 bar 408, T50 bar 410, and T50 bar 412 illustrate $T_{50}$ values for $NO_X$ conversion of TWC catalyst samples Types F, G, H, I, and J, respectively. In these embodiments, T50 bar 428, T50 bar 430, T50 bar 432, T50 bar 434, and T50 bar 436 illustrate $T_{50}$ values for HC conversion of TWC catalyst samples Types F, G, H, I, and J, respectively. Further to these embodiments, T50 bar 428, T50 bar 430, T50 bar 432, T50 bar 434, and T50 bar 436 illustrate $T_{50}$ values for HC conversion of TWC catalyst samples Types F, G, H, I, and J, respectively, as detailed in Table 1 above.

Figure 5:
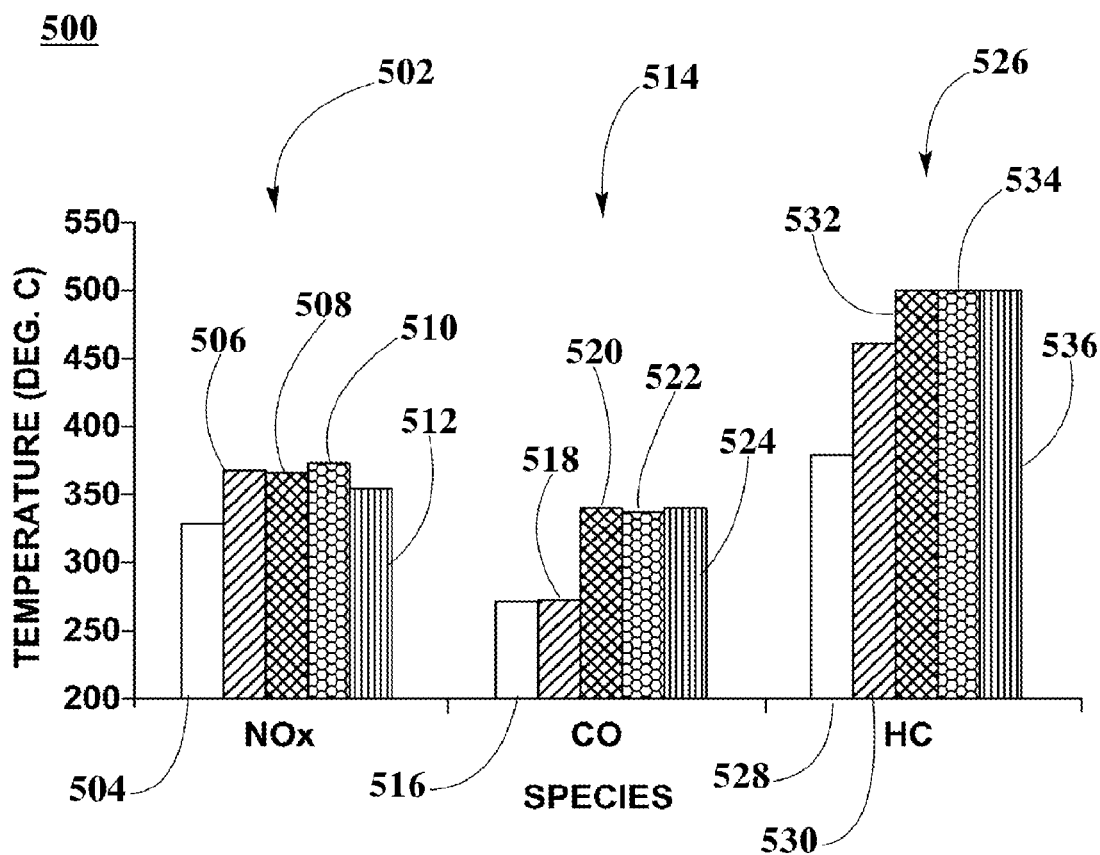
FIG. 5 is a graphical representation illustrating comparisons of $T_{90}$ values of $NO_X$, CO, and HC conversions calculated from a LO test methodology for TWC catalyst samples Types F, G, H, I, and J, according to an embodiment.

FIG. 5 is a graphical representation illustrating comparisons of $T_{90}$ values of $NO_X$, CO, and HC conversions calculated from a LO test methodology for TWC catalyst samples Types F, G, H, I, and J, according to an embodiment. In FIG. 5, T90 comparisons 500 include NOX-T90 comparisons 502, CO-T90 comparisons 514, and HC-T90 comparisons 526. In FIG. 5, NOX-T90 comparisons 502 additionally include T90 bar 504, T90 bar 506, T90 bar 508, T90 bar 510, and T90 bar 512. In FIG. 5, CO-T90 comparisons 514 also include T90 bar 516, T90 bar 518, T90 bar 520, T90 bar 522, and T90 bar 524. In FIG. 5 HC-T90 comparisons 526 further include T90 bar 528, T90 bar 530, T90 bar 532, T90 bar 534, and T90 bar 536.

In some embodiments, T90 bar 504, T90 bar 506, T90 bar 508, T90 bar 510, and T90 bar 512 illustrate $T_{90}$ values for $NO_X$ conversion of TWC catalyst samples Types F, G, H, I, and J, respectively. In these embodiments, T90 bar 516, T90 bar 518, T90 bar 520, T90 bar 522, and T90 bar 524 illustrate $T_{90}$ values for CO conversion of TWC catalyst samples Types F, G, H, I, and J, respectively. Further to these embodiments, T90 bar 528, T90 bar 530, T90 bar 532, T90 bar 534, and T90 bar 536 illustrate $T_{90}$ values for HC conversion of TWC catalyst samples Types F, G, H, I, and J, respectively, as detailed in Table 1.

In some embodiments, the interactions between the catalyst layers of the TWC catalyst Types A, B, C, D, E, F, G, H, I, and J are observed when reviewing the data from Table 1 and the associated graphs in FIGS. 2-5. In these embodiments, these interactions result from the application of the IMPG layer of Fe-activated Rh material compositions in the production of the aforementioned TWC catalyst systems. Further to these embodiments, the Ce—Zr based OSM, including about 30 wt % Ce, about 10 wt % La dopants, and zirconia for the remaining amount, is related to a surface area decrease within a range from about 30 $m^2/g$ to about 15 $m^2/g$, after the aforementioned TWC catalyst samples are aged under a multimode aging condition at about 1,000° C., for about 20 hours. Still further to these embodiments, under the aforementioned multimode aging condition and after adding Rh and Fe material compositions within the TWC structure, a low surface area is produced within a range from about 0.5 $m^2/g$ to about 1.5 $m^2/g$. In these embodiments, even with this low surface area TWC catalyst Type A, which is a reference Fe-activated Rh catalyst not including an OC layer, exhibits a significantly higher TWC performance. Further to these embodiments, for TWC catalyst Type A the LO temperatures $T_{50}$ during $NO_X$, CO, and HC conversions are 259.2° C., 254.4° C., and 282.2° C., respectively, while the LO temperatures $T_{90}$ during $NO_X$, CO, and HC conversions are 308.8° C., 264.4° C., and 348.4° C., respectively.

In these embodiments, TWC catalyst Types B and C exhibit substantially similar catalytic performance behavior (bars 206, 208, 306, 308 for $NO_X$ conversion, bars 218, 220, 318, 320 for CO conversion, and bars 230, 232, 330, 332 for HC conversion) as a result of the interaction between of Fe-activated Rh catalyst layer and the OC layers within both TWC catalysts, respectively, including Ce—Zr—Nd—Pr OSM (about 30 wt % Ce, about 60% Zr—Hf, about 5 wt % Nd, and about 5 wt % Pr) and Ce—Zr—Nd—Y OSM (about 31 wt % Ce, about 58.3 wt % Zr—Hf, about 5.5 wt % Nd, and about 5.2 wt % Y). This implies that the OC layer materials can be used freely with the Fe—Rh—Ce—Zr OSM catalyst material and may generate a large set of catalytic systems when PGM materials (Pt, Rh, Pd) are added to the support OC layer.

In these embodiments, TWC catalyst Types D, E, F, G, H, and I exhibit catalytic interactions between the Fe-activated Rh catalyst layer with the variations of conventional catalyst supports and additives within their respective OC layers.

In some embodiments, even though the catalyst interaction of TWC catalyst Types D-J are less than TWC catalyst Type A, high performance TWC catalysts can be produced by modifying the concentrations of the catalyst material compositions within the TWC structure. In these embodiments, this negative interaction can be observed when TWC catalyst Type A (reference Fe-activated Rh catalyst without OC layer) is compared with TWC catalyst Type G (OC layer including Ba carbonate). Further to these embodiments, even if the interaction of Ba with the Fe-activated Rh catalyst layer is less than TWC catalyst Type A, high performance catalysts can be produced with variations of mixed Ba oxide/carbonate impregnated onto a separate alumina/OSM layer. The co-impregnation ingredients of Ce and Nd may form a Ba perovskite and inhibit the Ba mobility.

In other embodiments, the catalytic performance of the TWC catalyst Types K, L, M, N, O, and reference catalyst Type 1 is assessed using TWC catalyst core samples. In these embodiments, TWC catalyst core samples are evaluated by performing a series of LO tests to determine the temperatures at which 50% conversion ($T_{50}$) and 90% conversion ($T_{90}$) of pollutants including $NO_X$, CO, and HC are achieved. Further to these embodiments, $T_{50}$ and $T_{90}$ values achieved per species converted are detailed in Table 2, below.

TABLE 2

Figure 6:
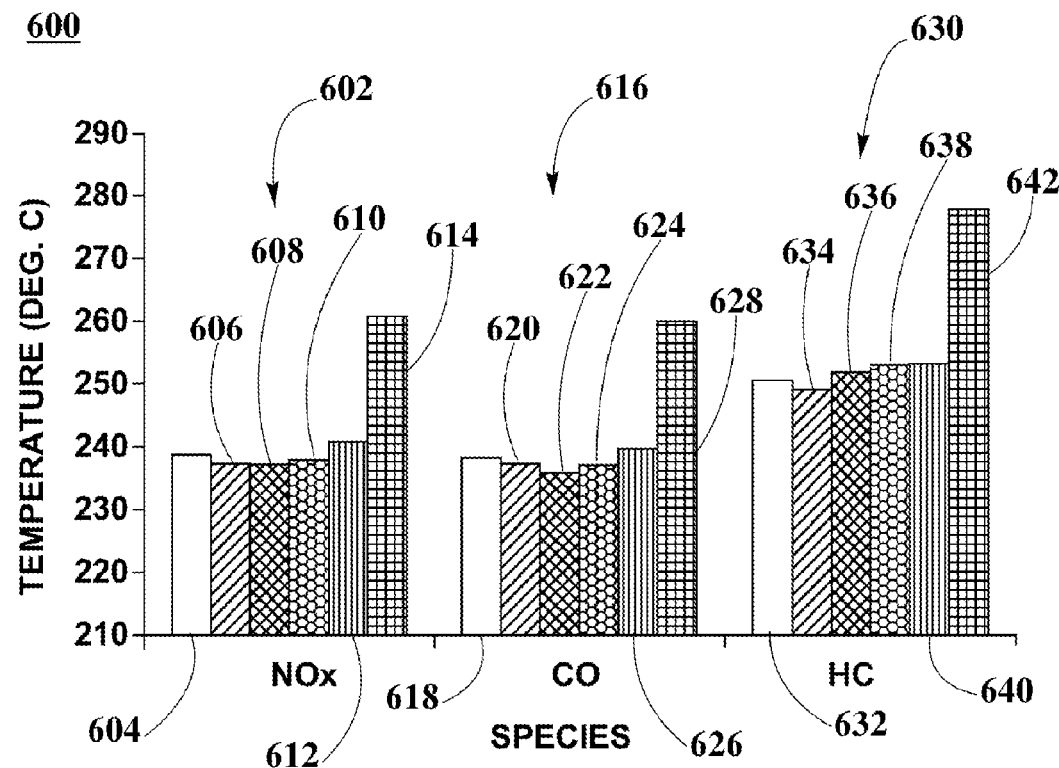
FIG. 6 is a graphical representation illustrating comparisons of $T_{50}$ values of $NO_X$, CO, and HC conversions calculated from a LO test methodology for TWC catalyst samples Types K, L, M, N, O, and reference catalyst Type 1, according to an embodiment.
Figure 7:
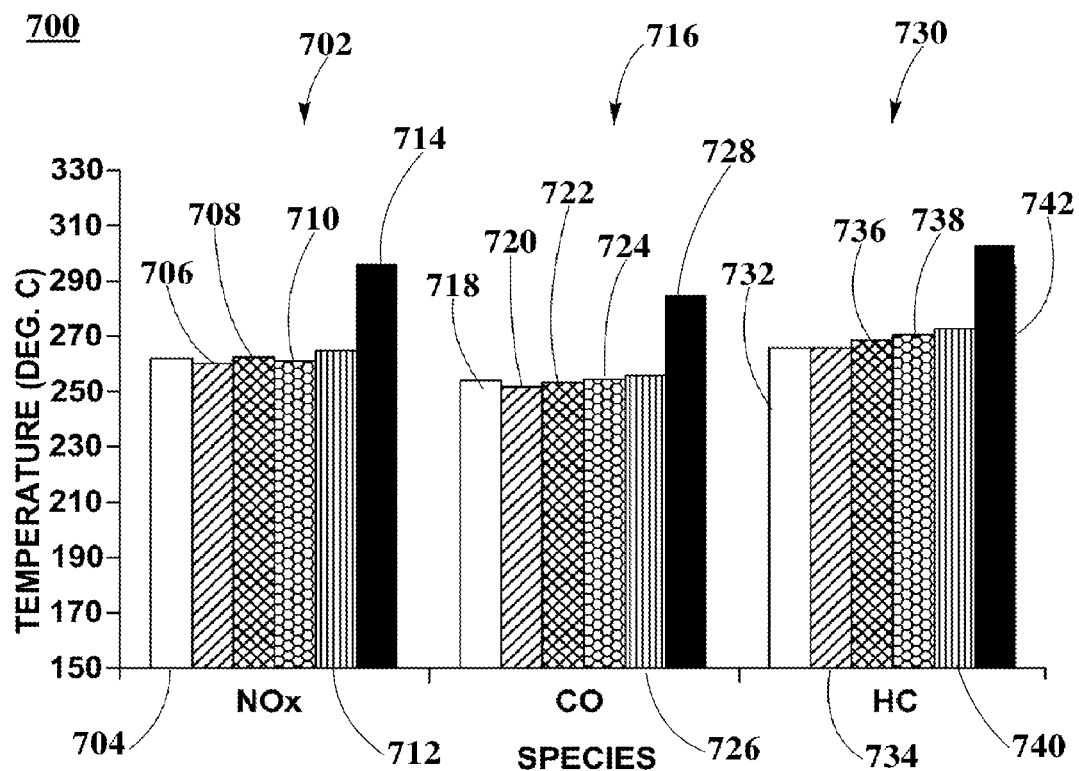
FIG. 7 is a graphical representation illustrating comparisons of $T_{90}$ values of $NO_X$, CO, and HC conversions calculated from a LO test methodology for TWC catalyst samples Types K, L, M, N, O, and reference catalyst Type 1, according to an embodiment.

$T_{50}$ and $T_{90}$ values for $NO_X$, CO, and HC conversions calculated from LO tests for TWC catalyst samples Types K, L, M, N, O, and reference catalyst Type 1, as illustrated in FIGS. 6-7.

| TWC Catalyst | $T_{50}$ (° C.) | | | $T_{90}$ (° C.) | | |
|---|---|---|---|---|---|---|
| Samples Types | $NO_X$ | CO | HC | $NO_X$ | CO | HC |
| K | 238.7 | 238.2 | 250.5 | 262.0 | 253.9 | 265.7 |
| L | 237.3 | 237.3 | 249.1 | 260.1 | 251.8 | 265.7 |
| M | 237.2 | 235.9 | 251.9 | 262.4 | 253.3 | 268.6 |
| N | 237.9 | 237.1 | 253.1 | 261.2 | 254.3 | 270.5 |
| O | 240.8 | 239.6 | 253.3 | 264.9 | 255.7 | 272.7 |
| Type 1 (Reference) | 260.8 | 260.0 | 277.9 | 295.9 | 282.4 | 302.6 |

FIG. 6 is a graphical representation illustrating comparisons of $T_{50}$ values of $NO_X$, CO, and HC conversions calculated from a LO test methodology for TWC catalyst samples Types K, L, M, N, O, and reference catalyst Type 1, according to an embodiment. In FIG. 6, T50 comparisons 600 include NOX-T50 comparisons 602, CO-T50 comparisons 616, and HC-T50 comparisons 630. In FIG. 6, NOX-T50 comparisons 602 additionally include T50 bar 604, T50 bar 606, T50 bar 608, T50 bar 610, T50 bar 612, and T50 bar 614. In FIG. 6, CO-T50 comparisons 616 also include T50 bar 618, T50 bar 620, T50 bar 622, T50 bar 624, T50 bar 626, and T50 bar 628. In FIG. 6, HC-T50 comparisons 630 further include T50 bar 632, T50 bar 634, T50 bar 636, T50 bar 638, T50 bar 640, and T50 bar 642.

In some embodiments, T50 bar 604, T50 bar 606, T50 bar 608, T50 bar 610, T50 bar 612, and T50 bar 614 illustrate $T_{50}$ values for $NO_X$ conversion of TWC catalyst samples Types K, L, M, N, O, and reference catalyst Type 1, respectively. In these embodiments, T50 bar 618, T50 bar 620, T50 bar 622, T50 bar 624, T50 bar 626, and T50 bar 628 illustrate $T_{50}$ values for CO conversion of TWC catalyst samples Types K, L, M, N, O, and reference catalyst Type 1, respectively. Further to these embodiments, T50 bar 632, T50 bar 634, T50 bar 636, T50 bar 638, T50 bar 640, and T50 bar 642 illustrate $T_{50}$ values for HC conversion of TWC catalyst samples Types K, L, M, N, O, and reference catalyst Type 1, respectively, as detailed in Table 2 above.

FIG. 7 is a graphical representation illustrating comparisons of $T_{90}$ values of $NO_X$, CO, and HC conversions calculated from a LO test methodology for TWC catalyst samples Types K, L, M, N, O, and reference catalyst Type 1, according to an embodiment. In FIG. 7, T90 comparisons 700 include NOX-T90 comparisons 702, CO-T90 comparisons 716, and HC-T90 comparisons 730. In FIG. 7, NOX-T90 comparisons 702 additionally include T90 bar 704, T90 bar 706, T90 bar 708, T90 bar 710, T90 bar 712, and T90 bar 714. In FIG. 7, CO-T90 comparisons 716 also include T90 bar 718, T90 bar 720, T90 bar 722, T90 bar 724, T90 bar 726, and T90 bar 728. In FIG. 7, HC-T90 comparisons 730 further include T90 bar 732, T90 bar 734, T90 bar 736, T90 bar 738, T90 bar 740, and T90 bar 742. .

In some embodiments, T90 bar 704, T90 bar 706, T90 bar 708, T90 bar 710, T90 bar 712, and T90 bar 714 illustrate $T_{90}$ values for $NO_X$ conversion of TWC catalyst samples Types K, L, M, N, O, and reference catalyst Type 1, respectively. In these embodiments, T90 bar 718, T90 bar 720, T90 bar 722, T90 bar 724, T90 bar 726, and T90 bar 728 illustrate $T_{90}$ values for CO conversion of TWC catalyst samples Types K, L, M, N, O, and reference catalyst Type 1, respectively. Further to these embodiments, T90 bar 732, T90 bar 734, T90 bar 736, T90 bar 738, T90 bar 740, and T90 bar 742 illustrate $T_{90}$ values for HC conversion of TWC catalyst samples Types K, L, M, N, O, and reference catalyst Type 1, respectively, as detailed in Table 2 above.

In some embodiments, the catalytic performance of the TWC catalyst Types P, Q, R, and reference catalyst Type 1 is assessed using TWC catalyst core samples. In these embodiments, TWC catalyst core samples are evaluated by performing a series of LO tests to determine the temperatures at which 50% conversion ($T_{50}$) and 90% conversion ($T_{90}$) of pollutants including $NO_X$, CO, and HC are achieved. Further to these embodiments, $T_{50}$ and $T_{90}$ values achieved per species converted are detailed in Table 3, below.

TABLE 3

Figure 8:
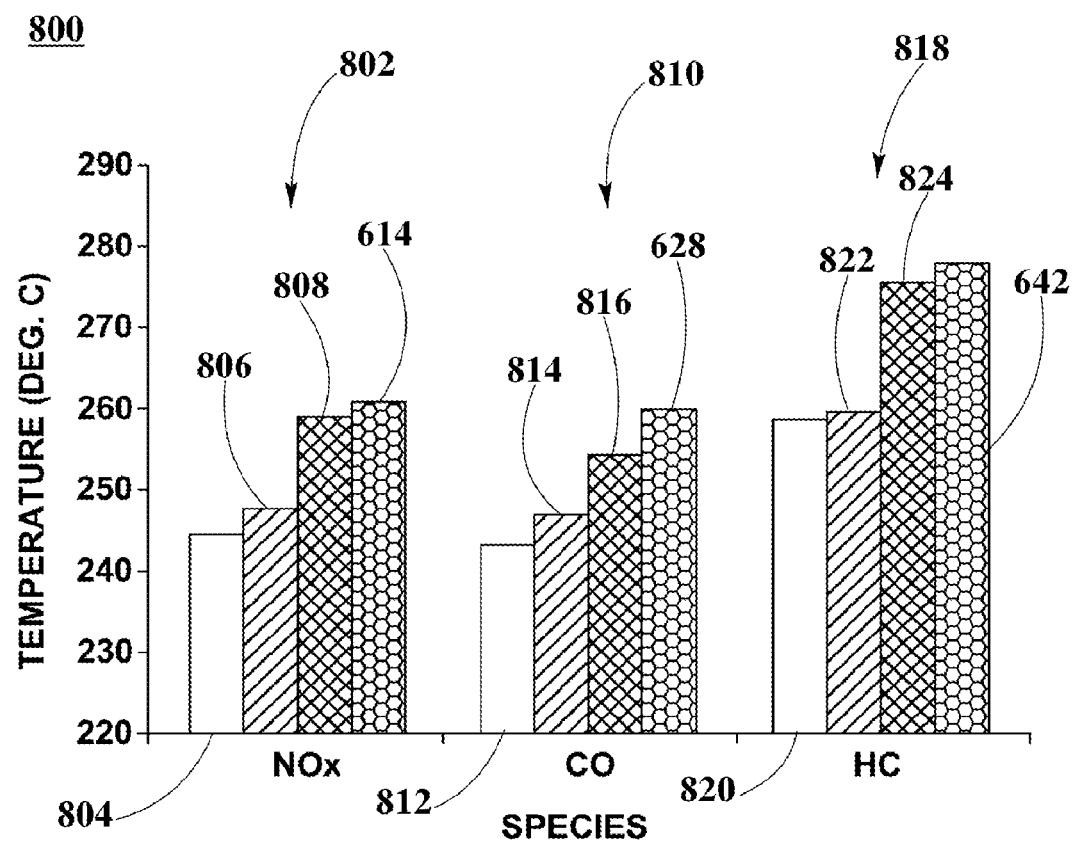
FIG. 8 is a graphical representation illustrating conversion comparisons of $T_{50}$ values of $NO_X$, CO, and HC conversions calculated from a LO test methodology for TWC catalyst samples Types P, Q, R, and reference catalyst Type 1, according to an embodiment.
Figure 9:
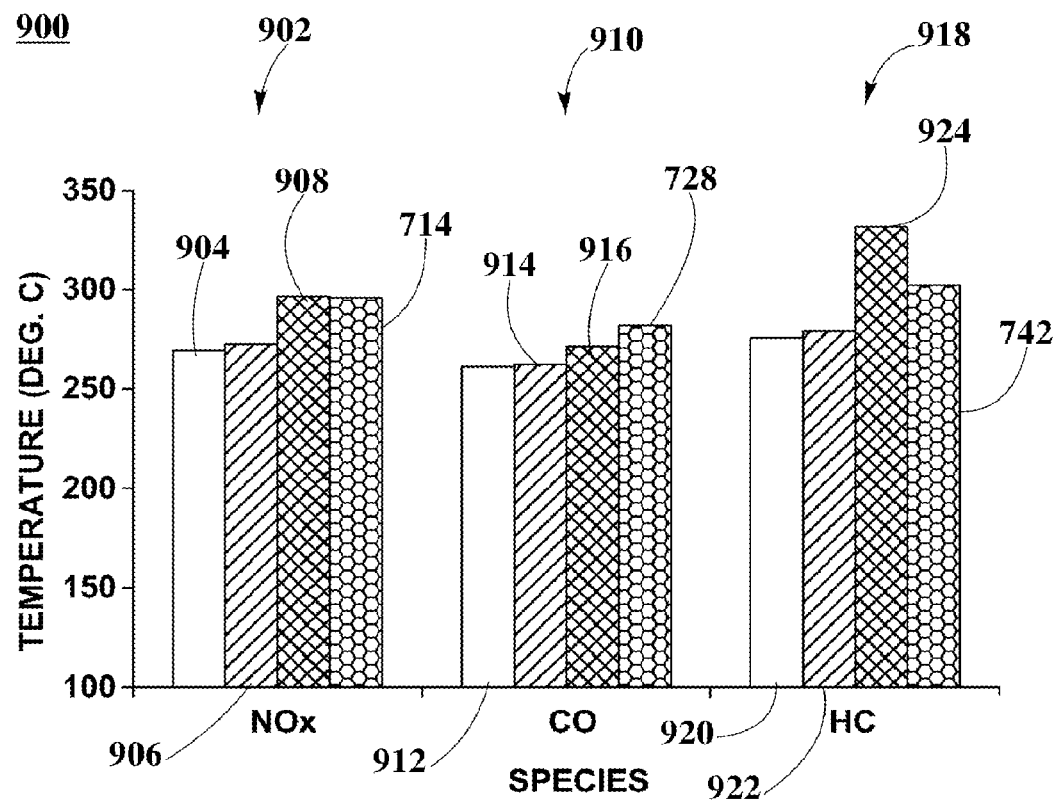
FIG. 9 is a graphical representation illustrating conversion comparisons of $T_{90}$ values of $NO_X$, CO, and HC conversions calculated from a LO test methodology for TWC catalyst samples Types P, Q, R, and reference catalyst Type 1, according to an embodiment.

$T_{50}$ and $T_{90}$ values for $NO_X$, CO, and HC conversions calculated from LO tests of TWC catalyst samples Types P, Q, R, and reference catalyst Type 1, as illustrated in FIGS. 8-9.

| TWC Catalyst | $T_{50}$ (° C.) | | | $T_{90}$ (° C.) | | |
|---|---|---|---|---|---|---|
| Samples Types | $NO_X$ | CO | HC | $NO_X$ | CO) | HC |
| P | 244.5 | 243.2 | 258.6 | 269.3 | 261.3 | 276.0 |
| Q | 247.7 | 246.9 | 259.6 | 272.6 | 262.3 | 279.5 |
| R | 259.0 | 254.2 | 275.7 | 296.6 | 271.4 | 331.7 |
| Type 1 (Reference) | 260.8 | 260.0 | 277.9 | 295.9 | 282.4 | 302.6 |

FIG. 8 is a graphical representation illustrating conversion comparisons of $T_{50}$ values of $NO_X$, CO, and HC conversions calculated from a LO test methodology for TWC catalyst samples Types P, Q, R, and reference catalyst Type 1, according to an embodiment. In FIG. 8, T50 comparisons 800 include NOX-T50 comparisons 802, CO-T50 comparisons 810, and HC-T50 comparisons 818. In FIG. 8, NOX-T50 comparisons 802 additionally include T50 bar 804, T50 bar 806, T50 bar 808, and T50 bar 614. In FIG. 8, CO-T50 comparisons 810 also include T50 bar 812, T50 bar 814, T50 bar 816, and T50 bar 628. In FIG. 8, HC-T50 comparisons 818 further include T50 bar 820, T50 bar 822, T50 bar 824, and T50 bar 642. In FIG. 8, elements having identical element numbers from previous figures perform in a substantially similar manner.

In some embodiments, T50 bar 804, T50 bar 806, T50 bar 808, and T50 bar 614 illustrate $T_{50}$ values for $NO_X$ conversion of TWC catalyst samples Types P, Q, R, and reference catalyst Type 1, respectively. In these embodiments, T50 bar 812, T50 bar 814, T50 bar 816, and T50 bar 628 illustrate $T_{50}$ values for CO conversion of TWC catalyst samples Types P, Q, R, and reference catalyst Type 1, respectively. Further to these embodiments, T50 bar 820, T50 bar 822, T50 bar 824, and T50 bar 642 illustrate $T_{50}$ values for HC conversion of TWC catalyst samples Types P, Q, R, and reference catalyst Type 1, respectively, as detailed in Table 3 above.

FIG. 9 is a graphical representation illustrating conversion comparisons of $T_{90}$ values of $NO_X$, CO, and HC conversions calculated from a LO test methodology for TWC catalyst samples Types P, Q, R, and reference catalyst Type 1, according to an embodiment. In FIG. 9, T90 comparisons 900 include NOX-T90 comparisons 902, CO-T90 comparisons 910, and HC-T90 comparisons 918. In FIG. 9, NOX-T90 comparisons 902 additionally include T90 bar 904, T90 bar 906, T90 bar 908, and T90 bar 714. In FIG. 9, CO-T90 comparisons 910 also include T90 bar 912, T90 bar 914, T90 bar 916, and T90 bar 728. In FIG. 9, HC-T90 comparisons 918 further include T90 bar 920, T90 bar 922, T90 bar 924, and T90 bar 742. In FIG. 9, elements having identical element numbers from previous figures perform in a substantially similar manner.

In some embodiments, T90 bar 904, T90 bar 906, T90 bar 908, and T90 bar 714 illustrate $T_{90}$ values for $NO_X$ conversion of TWC catalyst samples Types P, Q, R, and reference catalyst Type 1, respectively. In these embodiments, T90 bar 912, T90 bar 914, T90 bar 916, and T90 bar 728 illustrate $T_{90}$ values for CO conversion of TWC catalyst samples Types P, Q, R, and reference catalyst Type 1, respectively. Further to these embodiments, T90 bar 920, T90 bar 922, T90 bar 924, and T90 bar 742 illustrate $T_{90}$ values for HC conversion of TWC catalyst samples Types P, Q, R, and reference catalyst Type 1, respectively, as detailed in Table 3 above.

In some embodiments, the interactions between the catalyst layers of the TWC catalyst Types K, L, M, N, O, P, Q, and R are observed in Tables 2-3, and illustrated in FIGS. 6-9. In these embodiments, high performance catalysts can be produced with variations of mixed Ba oxide/carbonate impregnated onto a separate Alumina/OSM layer. Further to these embodiments, varying the Ba loadings enables the determination of the optimal Ba loadings that will provide the interaction with the Fe-activated Rh catalyst layer resulting in greater catalytic performance.

In these embodiments, the TWC structure for TWC catalyst Types K, L, M, N, O, P, and Q include 40% by weight of OSM including about 31 wt % Ce, about 58.3 wt % Zr—Hf, about 5.5 wt % Nd, and about 5.2 wt % Y, and about 60% by weight of a high surface area Alumina with $La_2O_3$ stabilized at high temperature deposited within the WC layers. Further to these embodiments, the IMPG layers include Pd nitrate, Ce nitrate, Nd nitrate, and Ba salt with loadings of about 92.6 g/ft$^3$ Pd, about 105.8 g/ft$^3$ Ce, and about 12.1 g/ft$^3$ Nd, and variations of Ba loadings within a range from about 57.6 g/ft$^3$ to about 691.3 g/ft$^3$. Still further to these embodiments, OC layers include Ce—Zr—Nd—Y OSM with Rh loading of about 9.07 g/ft$^3$ and Fe loading of about 210 g/ft$^3$.

In these embodiments, TWC catalyst Type R includes a WC layer substantially similar to TWC catalyst Types K through Q. Further to these embodiments, the IMPG layer includes loadings of about 22.0 g/ft$^3$ Pd, about 115.2 g/ft$^3$ Ba, about 105.8 g/ft$^3$ Ce, and about 12.1 g/ft$^3$ Nd. Still further to these embodiments, the OC layer includes Ce—Zr—Nd—Y OSM with Rh loading of about 3.6 g/ft$^3$ and Fe loading of about 210 g/ft$^3$.

In these embodiments, as observed in Tables 2-3, and illustrated in FIGS. 6-9, for TWC catalyst Types K through R, the LO temperatures $T_{50}$ and $T_{90}$ during $NO_X$, CO, and HC conversions are lower than the LO temperatures $T_{50}$ and $T_{90}$ for TWC catalyst Type A (reference Fe-activated Rh catalyst not including an OC layer), TWC catalyst Types B through J, and for reference catalyst Type 1, which is a commercially available SULEV30 close-coupled catalyst (CCC), including PGM loadings of about 94.7 g/ft3 Pd and about 7.3 g/ft3 Rh. Further to these embodiments, TWC catalyst Type R exhibits a high level of catalytic performance, with lower PGM loadings, which is substantially similar to the catalytic performance for TWC catalyst Type A.

Catalytic Conversion Efficiency of TWC Catalysts Including Ba—Pd and Rh—Fe Material Compositions In some embodiments, the catalytic conversion efficiency of the TWC catalyst core samples is evaluated by performing a series of WPPTs at a temperature of about 550° C. In these embodiments, the catalytic performance of the TWC catalyst Types A, B, C, D, E, F, G, H, I, and J are determined by performing test combinations of the TWC performance along with kinetically-limited reductive/oxidative storage capacity of the TWC catalyst core samples. Further to these embodiments, the WPPTs illustrate catalytic performance during out-of-loop A/F ratio excursions. Still further to these embodiments, % $NO_X$, % CO and % HC conversions for TWC catalyst Types A, B, C, D, E, F, G, H, I, and J are detailed in Table 4, below.

TABLE 4

Figure 10:
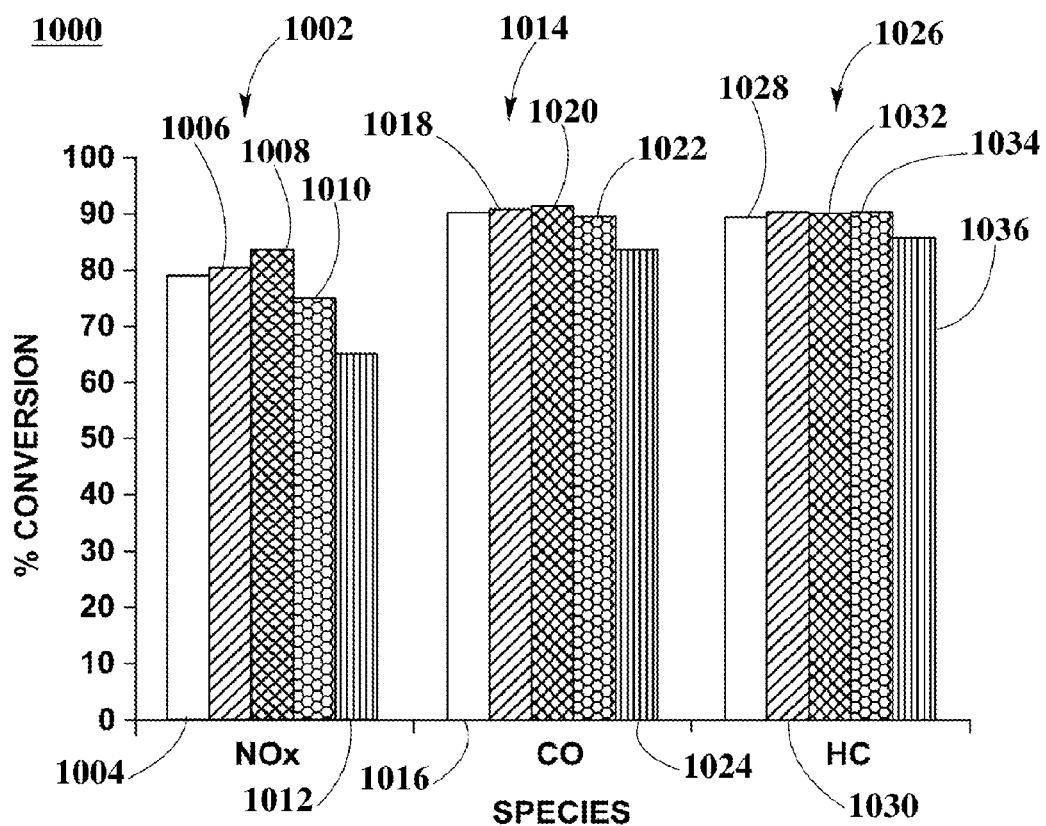
FIG. 10 is a graphical representation illustrating conversion comparisons of $NO_X$, CO, and HC for TWC catalyst samples Types A, B, C, D, and E, under wide pulse perturbation test condition at about 550° C., according to an embodiment.
Figure 11:
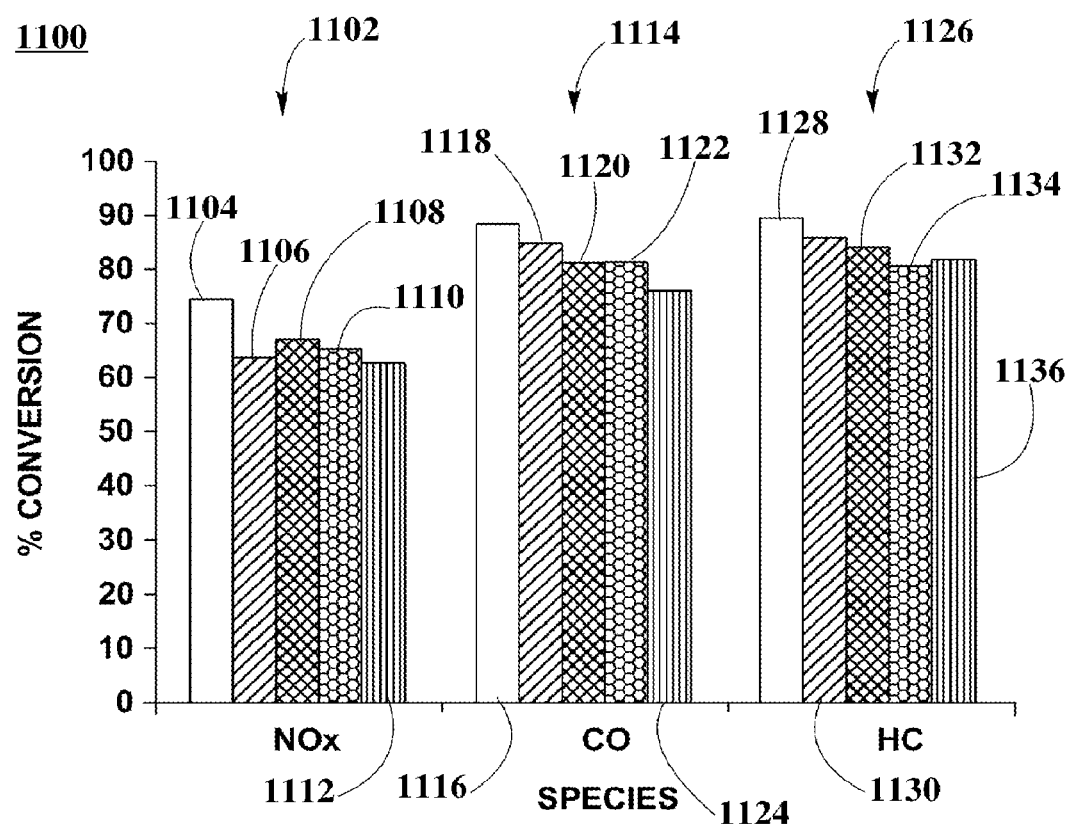
FIG. 11 is a graphical representation illustrating conversion comparisons of $NO_X$, CO, and HC for TWC catalyst samples Types F, G, H, I, and J, under wide pulse perturbation test condition at about 550° C., according to an embodiment.

% $NO_X$, % CO and % HC conversions for TWC catalyst Types A, B, C, D, E, F, G, H, I, and J, as illustrated in FIGS. 10-11.

| TWC Catalyst Samples | % Conversion WPPT @ 550° C. | | |
|---|---|---|---|
| Types | $NO_x$ | CO | HC |
| A | 79.0 | 90.2 | 89.4 |
| B | 80.4 | 90.8 | 90.4 |
| C | 83.6 | 91.4 | 90.1 |
| D | 75.1 | 89.4 | 90.3 |
| E | 65.1 | 83.7 | 85.7 |
| F | 74.4 | 88.3 | 89.5 |
| G | 63.6 | 84.8 | 86.0 |
| H | 67.0 | 81.2 | 84.1 |
| I | 65.3 | 81.3 | 80.6 |
| J | 62.7 | 76.1 | 81.8 |

FIG. 10 is a graphical representation illustrating conversion comparisons 1000 of $NO_X$, CO, and HC for TWC catalyst samples Types A, B, C, D, and E, under WPPT condition at 550° C., according to an embodiment. In FIG. 10, conversion comparisons 1000 include NOX conversion comparison 1002, CO conversion comparison 1014, and HC conversion comparison 1026. In FIG. 10, NOX conversion comparison 1002 additionally include bar 1004, bar 1006, bar 1008, bar 1010, and bar 1012. In FIG. 10, CO conversion comparison 1014 also include bar 1016, bar 1018, bar 1020, bar 1022, and bar 1024. In FIG. 10, HC conversion comparison 1026 further include bar 1028, bar 1030, bar 1032, bar 1034, and bar 1036.

In some embodiments, bar 1004, bar 1006, bar 1008, bar 1010, and bar 1012 illustrate % $NO_X$ conversion for TWC catalyst samples Types A, B, C, D, and E, respectively. In these embodiments, bar 1016, bar 1018, bar 1020, bar 1022, and bar 1024 illustrate % CO conversion for TWC catalyst samples Types A, B, C, D, and E, respectively. Further to these embodiments, bar 1028, bar 1030, bar 1032, bar 1034, and bar 1036 illustrate % HC conversion for TWC catalyst samples Types A, B, C, D, and E, respectively, as detailed in Table 4 above.

FIG. 11 is a graphical representation illustrating conversion comparisons 1100 of $NO_X$, CO, and HC for TWC catalyst samples Types F, G, H, I, and J, under WPPT condition at 550° C., according to an embodiment. In FIG. 11, conversion comparisons 1100 include NOX conversion comparison 1102, CO conversion comparison 1114, and HC conversion comparison 1126. In FIG. 11, NOX conversion comparison 1102 additionally include bar 1104, bar 1106, bar 1108, bar 1110, and bar 1112. In FIG. 11, CO conversion comparison 1114 also include bar 1116, bar 1118, bar 1120, bar 1122, and bar 1124. In FIG. 11, HC conversion comparison 1126 further include bar 1128, bar 1130, bar 1132, bar 1134, and bar 1136.

In some embodiments bar 1104, bar 1106, bar 1108, bar 1110, and bar 1112 illustrate % $NO_X$ conversion for TWC catalyst samples Types F, G, H, I, and J, respectively. In these embodiments, bar 1116, bar 1118, bar 1120, bar 1122, and bar 1124 illustrate % CO conversion for TWC catalyst samples Types F, G, H, I, and J, respectively. Further to these embodiments, bar 1128, bar 1130, bar 1132, bar 1134, and bar 1136 illustrate % HC conversion for TWC catalyst samples Types F, G, H, I, and J, respectively, as detailed in Table 4 above.

In other embodiments, the catalytic conversion efficiency of the TWC catalyst core samples is evaluated by performing a series of WPPTs at a temperature of about 400° C. In these embodiments, the catalytic performance of the TWC catalyst Types K, L, M, N, O, P, Q and reference catalyst Type 1 are determined by performing test combinations of the TWC performance along with kinetically-limited reductive/oxidative storage capacity of the TWC catalyst core samples. Further to these embodiments, the WPPTs illustrate catalytic performance during out-of-loop A/F ratio excursions. Still further to these embodiments, % $NO_X$, % CO and % HC conversions for TWC catalyst Types K, L, M, N, O, P, Q and reference catalyst Type 1 are detailed in Table 5, below.

TABLE 5

Figure 12:
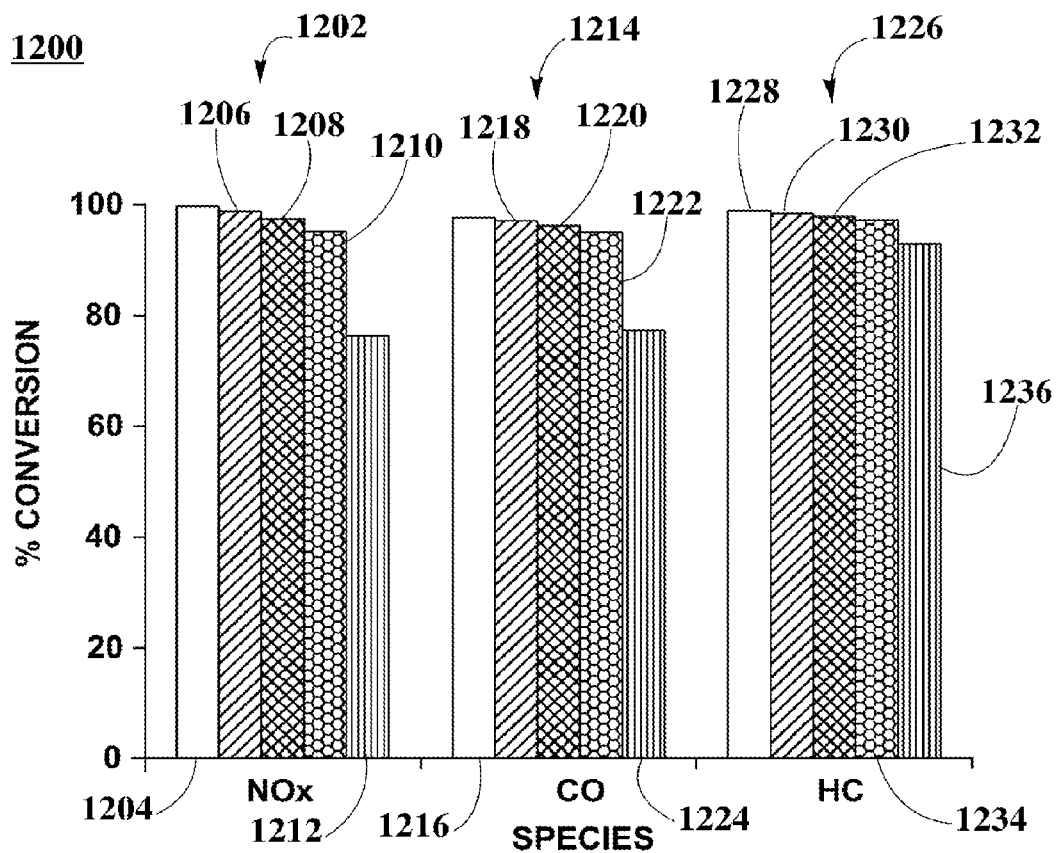
FIG. 12 is a graphical representation illustrating conversion comparisons of $NO_X$, CO, and HC for TWC catalyst samples Types K, L, M, N, and reference catalyst Type 1, under wide pulse perturbation test condition at about 400° C., according to an embodiment.
Figure 13:
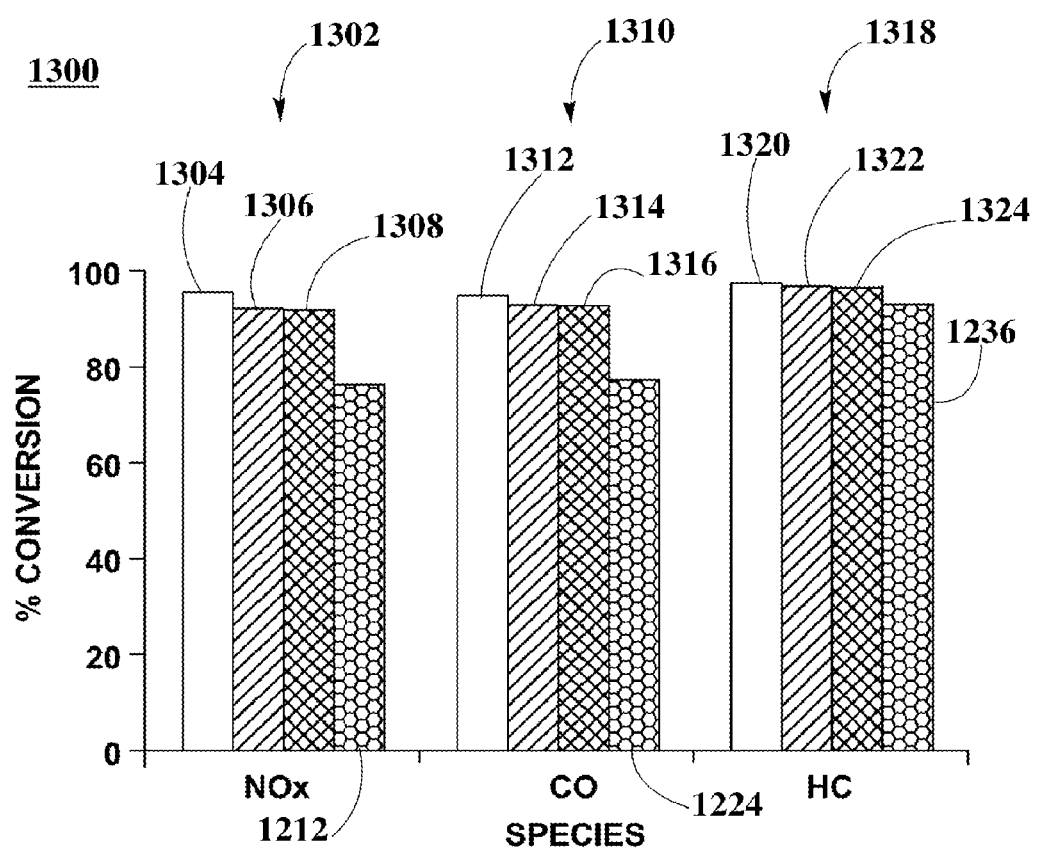
FIG. 13 is a graphical representation illustrating conversion comparisons of $NO_X$, CO, and HC for TWC catalyst samples Types O, P, Q, and reference catalyst Type 1, under wide pulse perturbation test condition at about 400° C., according to an embodiment.

% $NO_X$, % CO and % HC conversions for TWC catalyst Types K, L, M, N, O, P, Q and reference catalyst Type 1, as illustrated in FIGS. 12-13.

| TWC Catalyst Samples | % Conversion WPPT @ 400° C. | | |
|---|---|---|---|
| Types | $NO_X$ | CO | HC |
| K | 99.8 | 97.7 | 99.0 |
| L | 98.9 | 97.2 | 98.5 |
| M | 97.5 | 96.3 | 97.9 |
| N | 95.2 | 95.0 | 97.3 |
| O | 95.6 | 94.8 | 97.6 |
| P | 92.2 | 92.9 | 96.8 |
| Q | 91.9 | 92.8 | 96.6 |
| Type 1 (Reference) | 76.3 | 77.3 | 93.0 |

FIG. 12 is a graphical representation illustrating conversion comparisons 1200 of $NO_X$, CO, and HC for TWC catalyst samples Types K, L, M, N, and reference catalyst Type 1, under WPPT condition at 400° C., according to an embodiment. In FIG. 12, conversion comparisons 1200 include NOX conversion comparison 1202, CO conversion comparison 1214, and HC conversion comparison 1226. In FIG. 12, NOX conversion comparison 1202 additionally include bar 1204, bar 1206, bar 1208, bar 1210, and bar 1212. In FIG. 12, CO conversion comparison 1214 also include bar 1216, bar 1218, bar 1220, bar 1222, and bar 1224. In FIG. 12, HC conversion comparison 1226 further include bar 1228, bar 1230, bar 1232, bar 1234, and bar 1236.

In some embodiments, bar 1204, bar 1206, bar 1208, bar 1210, and bar 1212 illustrate % $NO_X$ conversion for TWC catalyst samples Types K, L, M, N, and reference catalyst Type 1, respectively. In these embodiments, bar 1216, bar 1218, bar 1220, bar 1222, and bar 1224 illustrate % CO conversion for TWC catalyst samples Types K, L, M, N, and reference catalyst Type 1, respectively. Further to these embodiments, bar 1228, bar 1230, bar 1232, bar 1234, and bar 1236 illustrate % HC conversion for TWC catalyst samples K, L, M, N, and reference catalyst Type 1, respectively, as detailed in Table 5.

FIG. 13 is a graphical representation illustrating conversion comparisons 1300 of $NO_X$, CO, and HC for TWC catalyst samples Types O, P, Q, and reference catalyst Type 1, under WPPT condition at 400° C., according to an embodiment. In FIG. 13, conversion comparisons 1300 include NOX conversion comparison 1302, CO conversion comparison 1310, and HC conversion comparison 1318. In FIG. 13, NOX conversion comparison 1302 additionally include bar 1304, bar 1306, bar 1308, and bar 1212. In FIG. 13, CO conversion comparison 1310 also include bar 1312, bar 1314 bar 1316, and bar 1224. In FIG. 13, HC conversion comparison 1318 further include bar 1320, bar 1322, bar 1324, and bar 1236. In FIG. 13, elements having identical element numbers from previous figures perform in a substantially similar manner In some embodiments, bar 1304, bar 1306, bar 1308, and bar 1212 illustrate % $NO_X$ conversion for TWC catalyst samples Types O, P, Q, and reference catalyst Type 1, respectively. In these embodiments, bar 1312, bar 1314 bar 1316, and bar 1224 illustrate % CO conversion for TWC catalyst samples Types O, P, Q, and reference catalyst Type 1, respectively. Further to these embodiments, bar 1320, bar 1322, bar 1324, and bar 1236 illustrate % HC conversion for TWC catalyst samples O, P, Q, and reference catalyst Type 1, respectively, as detailed in Table 5 above.

In some embodiments, the catalytic conversion efficiencies of the TWC catalyst systems (TWC catalyst Types A through Q) are observed in Tables 4-5 and illustrated in FIGS. 10-13. In these embodiments, greater conversion efficiencies measured during WPPTs at temperatures of about 550° C. and about 400° C. are the result of the interaction of Pd and Ba oxide/carbonate impregnated onto a separate Alumina/OSM layer. Further to these embodiments, the TWC catalyst Types A through J exhibit $NO_X$, CO, and HC conversions within ranges from about 83.6% to about 62.7%, from about 91.4% to about 76.1%, and from about 90.4% to about 80.6%, respectively. Still further to these embodiments, the TWC catalyst Types K through Q exhibit $NO_X$, CO, and HC conversions within ranges from about 99.8% to about 91.9%, from about 97.7% to about 92.8%, and from about 99.0% to about 96.6%, respectively.

In these embodiments, TWC catalyst Type C, in FIG. 10, exhibits the greatest conversion efficiency in $NO_X$, CO, and HC conversions of TWC catalyst Types A through J (bar 1008 illustrates about 83.6% $NO_X$ conversion, bar 1020 illustrates about 91.4% CO conversion, and bar 1032 illustrates about 90.1% HC conversion). Further to these embodiments, TWC catalyst Type K, in FIG. 12, exhibits the greatest conversion efficiency of all (Types A through R) the aforementioned TWC catalyst systems in $NO_X$, CO, and HC conversions (bar 1204 illustrates about 99.8% $NO_X$ conversion, bar 1216 illustrates about 97.7% CO conversion, and bar 1228 illustrates about 99.0% HC conversion).

In these embodiments, the early LO temperatures of the aforementioned TWC catalyst systems indicate highly significant catalytic performance in the plurality of interactions of the Fe-activated Rh reference catalyst with both common and/or uncommon catalyst supports and additives. Further to these embodiments, catalytic samples including impregnated layers having variations of Pd, Ba, Ce, and Nd loadings exhibit improved earlier LO temperature performance when compared with the aforementioned TWC catalyst samples as well as with either the Fe-activated Rh reference catalyst (TWC catalyst Type A) or the reference catalyst Type 1 (commercially available SULEV30 CCC, including PGM loadings of about 94.7 g/ft3 Pd and about 7.3 g/ft3 Rh).

Both the LO tests and WPPTs confirm the enhanced catalytic performance of the aforementioned TWC catalyst systems. Further, performing test combinations of the TWC performance along with kinetically-limited reductive/oxidative storage capacity of the TWC catalyst core samples illustrate catalytic performance during out-of-loop A/F ratio excursions.

OSC of TWC Catalysts Including Rh—Fe Material Compositions

In some embodiments, the OSC of the TWC catalyst core samples are evaluated by performing a series of standard isothermal OSC oscillating tests at a temperature of about 525° C. In these embodiments, The OSC of the TWC catalyst Types A, B, C, D, E, F, G, H, I, and J are determined in terms of $O_2$ and CO delay times, as detailed in Table 6, below.

TABLE 6

Figure 14:
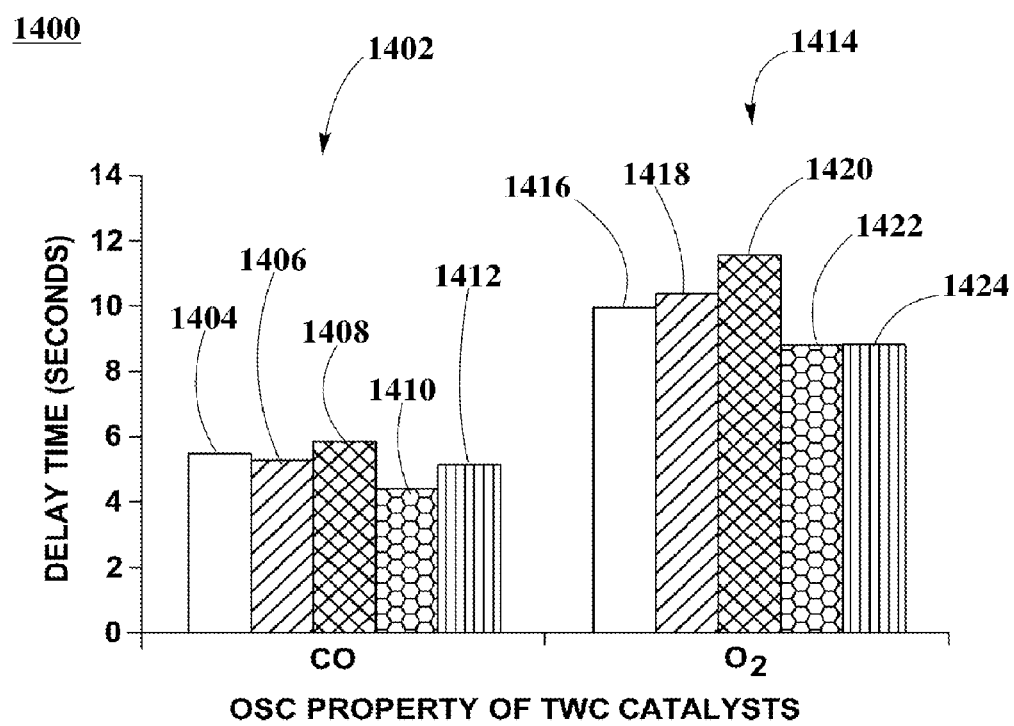
FIG. 14 is a graphical representation illustrating a comparison of CO and $O_2$ delay times for TWC catalyst samples Types A, B, C, D, and E, under oxygen storage capacity (OSC) test condition at about 525° C., according to an embodiment.
Figure 15:
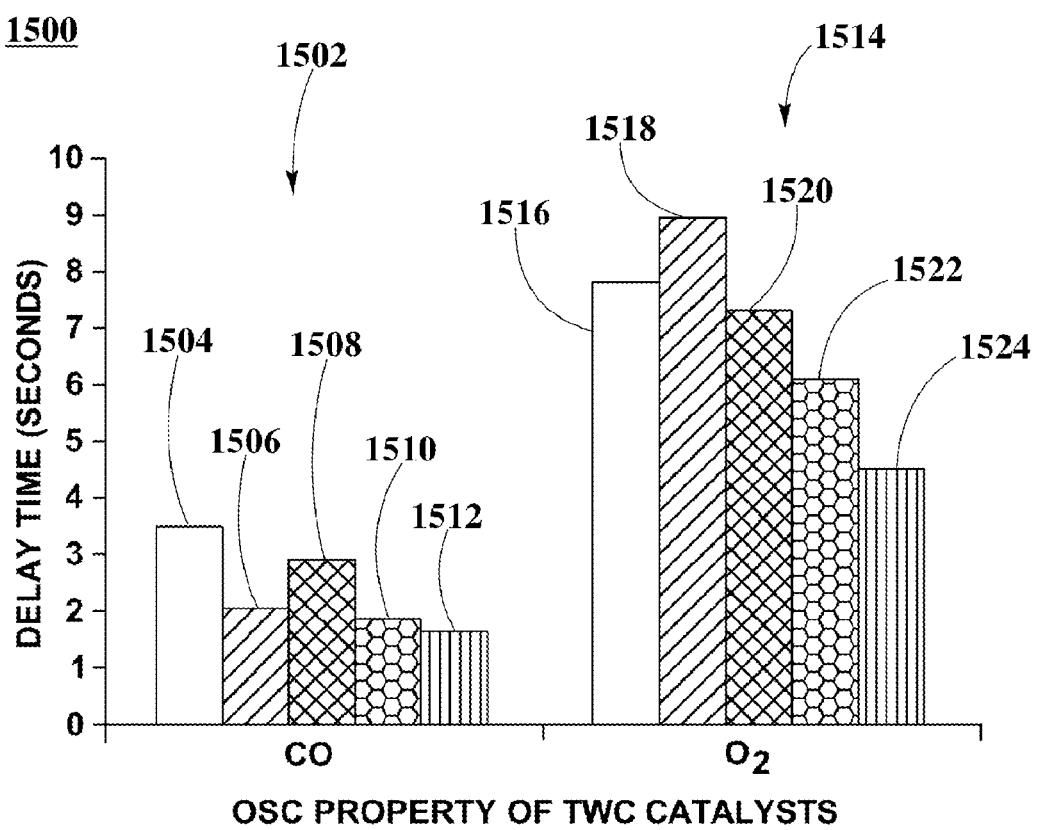
FIG. 15 is a graphical representation illustrating a comparison of CO and $O_2$ delay times for TWC catalyst samples Types F, G, H, I, and J, under oxygen storage capacity (OSC) test condition at about 525° C., according to an embodiment.

$O_2$ and CO delay times for TWC catalyst Types A, B, C, D, E, F, G, H, I, and J, as illustrated in FIGS. 14-15.

| TWC Catalyst | Delay Times [sec] OSC Oscillating Test @ 525° C. | |
|---|---|---|
| Samples Types | CO Delay Time | $O_2$ Delay Time |
| A | 5.49 | 9.94 |
| B | 5.27 | 10.33 |
| C | 5.86 | 11.55 |
| D | 4.42 | 8.82 |
| E | 5.13 | 8.84 |
| F | 3.52 | 7.82 |
| G | 2.05 | 8.96 |
| H | 2.90 | 7.32 |
| I | 1.87 | 6.10 |
| J | 1.65 | 4.52 |

FIG. 14 is a graphical representation illustrating a comparison of CO and $O_2$ delay times 1400 for TWC catalyst samples Types A, B, C, D, and E, under oxygen storage capacity (OSC) oscillating test at 525° C., according to an embodiment. In FIG. 14, delay times 1400 include CO delay time comparison 1402, and $O_2$ delay time comparison 1414. In FIG. 14, CO delay time comparison 1402 additionally include bar 1404, bar 1406, bar 1408, bar 1410, and bar 1412. In FIG. 14, $O_2$ delay time comparison 1414 further include bar 1416, bar 1418, bar 1420, bar 1422, and bar 1424.

In some embodiments, bar 1404, bar 1406, bar 1408, bar 1410, and bar 1412 illustrate CO delay time in seconds for TWC catalyst samples Types A, B, C, D, and E, respectively. In these embodiments, bar 1416, bar 1418, bar 1420, bar 1422, and bar 1424 illustrate $O_2$ delay time in seconds for TWC catalyst samples Types A, B, C, D, and E, respectively, as detailed in Table 6 above.

FIG. 15 is a graphical representation illustrating a comparison of CO and $O_2$ delay times 1500 for TWC catalyst samples Types F, G, H, I, and J, under oxygen storage capacity (OSC) oscillating test at 525° C., according to an embodiment. In FIG. 15, delay times 1500 include CO delay time comparison 1502, and O₂ delay time comparison 1514. In FIG. 15, CO delay time comparison 1502 additionally include bar 1504, bar 1506, bar 1508, bar 1510, and bar 1512. In FIG. 15, O₂ delay time comparison 1514 further include bar 1516, bar 1518, bar 1520, bar 1522, and bar 1524.

In some embodiments, bar 1504, bar 1506, bar 1508, bar 1510, and bar 1512 illustrate CO delay time in seconds for TWC catalyst samples Types A, B, C, D, and E, respectively. In these embodiments, bar 1516, bar 1518, bar 1520, bar 1522, and bar 1524 illustrate O₂ delay time in seconds for TWC catalyst samples Types A, B, C, D, and E, respectively, as detailed in Table 6 above.

In some embodiments, as previously described, the Ce—Zr based OSM, including about 30 wt % Ce, about 10 wt % lanthanide dopants, and zirconia for the remaining amount, is related to a surface area decrease to surface area in a range from about 30 m$^2$/g to about 15 m$^2$/g, after multimode aging at about 1,000° C., for about 20 hours. In these embodiments, adding Rh and Fe to the material compositions produces after aging a low surface area within a range from about 0.5 m$^2$/g to about 1.5 m$^2$/g. Further to these embodiments, even with this low surface area the reference Fe-activated Rh catalyst without an OC layer exhibits a significant TWC performance. In these embodiments, the OSC of the TWC catalyst Types A through J (all including a Fe-activated Rh catalyst layer within the TWC structure) in terms of CO and O₂ delay times and measured during the OSC oscillating tests at about 525° C. are observed in Table 6, and illustrated in FIGS. 14-15. Further to these embodiments, the low surface area produced after applying the Fe-activated Rh catalyst layer results from improvements in the oxygen transport of the modified OSM, which is also consistent with TWC catalysts exhibiting highly significant OSC.

In these embodiments, the interactions of the Fe-activated Rh catalyst layer with both common and uncommon catalyst supports and additives are verified by the aforementioned LO test results and catalytic efficiencies measured using WPPTs.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A catalyst system, comprising:
   a substrate;
   a washcoat deposited on the substrate;
   at least one impregnation layer; and
   an overcoat;
   wherein the washcoat comprises at least one of the group consisting of about 10 (w/w) to about 75 (w/w) cerium oxide, about 25 (w/w) to about 90 (w/w) zirconium-hafnium oxide, about 0 (w/w) to about 15 (w/w) lanthanum oxide, about 0 (w/w) to about 15 (w/w) neodymium oxide, about 0 (w/w) to about 15 (w/w) yttrium oxide, and about 0 (w/w) to about 15 (w/w) praseodymium oxide;
   wherein the at least one impregnation layer comprises rhodium at about 1 g/ft$^3$ to about g/ft$^3$ and iron at about 60 g/ft$^3$ to about 630 g/ft$^3$ ; and
   wherein the overcoat comprises at least one of the group consisting of an oxygen storage material, support oxides, barium carbonate, doped alumina, strontium carbonate, and combinations thereof.

2. The catalyst system of claim 1, wherein the overcoat is platinum group metal free.

3. The catalyst system of claim 1, wherein the washcoat comprises a first oxygen storage material including about 31 (w/w) cerium, about 58 (w/w) zirconium-hafnium, about 5.5 (w/w) neodymium, and about 5 (w/w) yttrium oxide.

4. The catalyst system of claim 1, wherein the at least one impregnation layer comprises about 3 g/ft$^3$ rhodium.

5. The catalyst system of claim 1, wherein the at least one impregnation layer comprises about 140 g/ft$^3$ iron.

6. The catalyst system of claim 1, wherein the overcoat comprises the oxygen storage material and wherein the oxygen storage material includes about 30 (w/w) Ce, about 60 (w/w) Zr—Hf, about 5 (w/w) Nd, and about 5 (w/w) Pr oxides.

7. The catalyst system of claim 1, wherein the overcoat comprises the oxygen storage material and wherein the oxygen storage material includes about 30 (w/w) Ce, about 58 (w/w) Zr—Hf, about 5.5 (w/w) Nd, and about 5 (w/w) yttrium oxides and wherein the oxygen storage material is loaded at about 42 g/L.

8. The catalyst system of claim 1, wherein the overcoat comprises high surface area alumina stabilized with La$_2$O$_3$ .

9. The catalyst system of claim 8, wherein the overcoat is loaded with 40 g/L of the high surface area alumina stabilized with La$_2$O$_3$.

10. A catalyst system, comprising:
    a substrate;
    a washcoat deposited on the substrate;
    at least one impregnation layer impregnated in the washcoat; and
    an overcoat;
    wherein the at least one impregnation layer comprises Pd nitrate, Ce nitrate, Nd nitrate,
    and a Ba salt;
    wherein the Ba salt is loaded from about 50 g/ft$^3$ to about 700 g/ft$^3$.

11. The catalyst system of claim 10, wherein the overcoat comprises an oxygen storage material including Ce, Zr, Nd, and Y; wherein the oxygen storage material is impregnated with Fe nitrate; and wherein the overcoat is further impregnated with Rh nitrate.

12. The catalyst system of claim 11, wherein the overcoat is loaded with about 9 g/ft$^3$ Rh.

13. The catalyst system of claim 12, wherein the overcoat is loaded with about 210 g/ft$^3$ .

14. The catalyst system of claim 11, wherein the at least one impregnation layer is loaded with about 22 g/ft$^3$ Pd, about 115 g/ft$^3$ Ba, about 105 g/ft$^3$ Ce, and about 12 g/ft$^3$ Nd.

15. The catalyst system of claim 10, wherein the at least one impregnation layer is loaded with about 92 g/ft$^3$ Pd, about 105 g/ft$^3$ Ce, and about 12 g/ft$^3$ Nd.

16. The catalyst system of claim 15, wherein the at least one impregnation layer is loaded with about 140 g/ft$^3$ iron.

17. The catalyst system of claim 10, wherein the at least one impregnation layer is loaded with about 22 g/ft$^3$ Pd, about 115 g/ft$^3$ Ba, about 105 g/ft$^3$ Ce, and about 12 g/ft$^3$ Nd.

18. The catalyst of claim 10, wherein the at least one impregnation layer is loaded with about 50 g/ft$^3$ to about 230 g/ft$^3$ of the Ba salt.

* * * * *